United States Patent
Mccann et al.

(10) Patent No.: US 11,628,940 B2
(45) Date of Patent: *Apr. 18, 2023

(54) APPARATUS AND METHOD FOR OPERATING A GLIDING PARACHUTE/KITE

(71) Applicant: Mist Mobility Integrated Systems Technology Inc., Ottawa (CA)

(72) Inventors: Sean Mccann, Ottawa (CA); Alexandre Cote, Ottawa (CA); Eric Dainty, Ottawa (CA); David Gransden, Ottawa (CA)

(73) Assignee: Mist Mobility Integrated Systems Technology Inc., Ottawa (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/860,934

(22) Filed: Jul. 8, 2022

(65) Prior Publication Data

US 2022/0340288 A1  Oct. 27, 2022

Related U.S. Application Data

(63) Continuation of application No. 17/535,299, filed on Nov. 24, 2021, now Pat. No. 11,420,753.

(Continued)

(51) Int. Cl.
*B64D 17/34* (2006.01)
*G05D 1/10* (2006.01)
*B64D 17/02* (2006.01)

(52) U.S. Cl.
CPC ........... *B64D 17/343* (2013.01); *G05D 1/105* (2013.01); *B64D 17/025* (2013.01)

(58) Field of Classification Search
CPC .... B64D 17/343; B64D 17/025; B64D 17/34; G05D 1/105; B64C 19/00; B64C 31/036
See application file for complete search history.

(56) References Cited

U.S. PATENT DOCUMENTS 2,203,083 A  6/1940  Doerr
3,386,687 A  6/1968  Rollins
(Continued)

FOREIGN PATENT DOCUMENTS

AU    2002302091 A1 *  6/2004
CA       2750638 A1 *  2/2013  .............. F03D 5/00
(Continued)

OTHER PUBLICATIONS

Why Do Parachutes Come in Different Shapes and Sizes, Jun. 10, 2017, 8 pages, available at: https://skydivemonroe.com/blog/why-do-parachutes-come-in-different-shapes-and-sizes/.
(Continued)

*Primary Examiner* — Donald J Wallace
*Assistant Examiner* — Jalal C Coduroglu
(74) *Attorney, Agent, or Firm* — Dentons Canada LLP

(57) ABSTRACT

Disclosed is an apparatus and method for operating a gliding parachute/kite. The gliding parachute/kite has a wing with a flexible material, and a set of suspension lines adapted for coupling a load to the wing, such that the coupling is configurable in any one of a plurality of possible states based on relative lengths of the suspension lines. In some implementations, the possible states include a first state enabling gliding in a first direction, and a second state enabling gliding in a second direction that is opposite to the first direction. Reversing direction is possible with the first and second states. Additionally, or alternatively, the possible states include a spinning state enabling spinning of the gliding parachute/kite. Adjusting a rate of decent is possible with the spinning. Reversing direction and/or spinning operations can be used to improve control of trajectory.

24 Claims, 16 Drawing Sheets

Related U.S. Application Data

(60) Provisional application No. 63/198,941, filed on Nov. 24, 2020.

(56) References Cited

U.S. PATENT DOCUMENTS

| | | | | |
|---|---|---|---|---|
| 3,780,663 | A * | 12/1973 | Pettit | A61G 7/1042 |
| | | | | 119/857 |
| 3,796,399 | A | 3/1974 | Wechsler | |
| 4,399,969 | A | 8/1983 | Gargano | |
| 4,434,956 | A * | 3/1984 | Gonzales | B64C 27/46 |
| | | | | 244/6 |
| 4,530,477 | A | 7/1985 | Ito et al. | |
| 4,705,238 | A | 11/1987 | Gargano | |
| 4,749,156 | A * | 6/1988 | Davenport | B64D 17/025 |
| | | | | 244/145 |
| 4,927,100 | A * | 5/1990 | Provenzo, Jr. | A63H 27/08 |
| | | | | 244/214 |
| 5,052,641 | A * | 10/1991 | Coleman | B64C 3/54 |
| | | | | 244/218 |
| 5,368,259 | A | 11/1994 | Tabor | |
| 5,678,788 | A | 10/1997 | Hetzer et al. | |
| 5,908,341 | A | 6/1999 | Dasa | |
| 6,131,856 | A | 10/2000 | Brown | |
| 6,327,994 | B1 * | 12/2001 | Labrador | B63B 39/06 |
| | | | | 114/382 |
| 6,808,144 | B1 * | 10/2004 | Nicolai | B64D 17/025 |
| | | | | 244/152 |
| 6,962,308 | B2 | 11/2005 | Schwaerzler, II et al. | |
| 9,218,004 | B2 | 12/2015 | Harber | |
| 9,315,273 | B2 | 4/2016 | McCann et al. | |
| 10,464,681 | B1 | 11/2019 | Western et al. | |
| 11,180,253 | B1 * | 11/2021 | Seeley | B64F 1/36 |
| 2003/0025038 | A1 * | 2/2003 | Nicolai | B64D 17/025 |
| | | | | 244/152 |
| 2004/0195435 | A1 * | 10/2004 | Logosz | B64C 31/06 |
| | | | | 244/15 |
| 2010/0117371 | A1 | 5/2010 | Ippolito et al. | |
| 2010/0213718 | A1 | 8/2010 | Kelly | |
| 2011/0163198 | A1 | 7/2011 | Leaver | |
| 2012/0049533 | A1 * | 3/2012 | Kelly | F03D 9/25 |
| | | | | 290/55 |
| 2012/0104763 | A1 | 5/2012 | Lind | |
| 2012/0227389 | A1 * | 9/2012 | Hinderks | F01L 3/02 |
| | | | | 60/317 |
| 2015/0225080 | A1 * | 8/2015 | Bormann | B64F 3/00 |
| | | | | 244/155 A |
| 2016/0137303 | A1 | 5/2016 | Pullam et al. | |
| 2017/0210479 | A1 * | 7/2017 | Barrows | B64D 1/08 |
| 2017/0253339 | A1 | 9/2017 | Berland | |
| 2018/0251223 | A1 | 9/2018 | Tumazzo | |
| 2019/0154439 | A1 * | 5/2019 | Binder | G01B 11/26 |
| 2020/0346781 | A1 * | 11/2020 | Bosma | B67D 7/04 |
| 2022/0161934 | A1 * | 5/2022 | Mccann | G05D 1/105 |

FOREIGN PATENT DOCUMENTS

| | | | | |
|---|---|---|---|---|
| DE | 4218557 | | 12/1993 | |
| DE | 10255766 | | 6/2004 | |
| DE | 102004051708 | A1 * | 4/2006 | B63B 35/7976 |
| DE | 102005002941 | A1 * | 7/2006 | B63B 35/7976 |
| DE | 102007006048 | | 8/2008 | |
| FR | 2343650 | | 10/1977 | |
| TW | 200926033 | | 6/2009 | |
| WO | 9005663 | | 5/1990 | |
| WO | 2008120257 | | 10/2008 | |
| WO | WO-2017149526 | A2 * | 9/2017 | G01B 11/026 |
| WO | WO-2019005467 | A2 * | 1/2019 | B62M 9/00 |

OTHER PUBLICATIONS

MC-4 Ram Air Free-Fall Personnel Parachute System by FAA (Year: 2003).
Powered Parachute Flying Handbook by FAA (Year: 2007).
Parachute Rigger Handbook by FAA (Year: 2015).
International Search Report and Written Opinion dated Feb. 17, 2022 for corresponding International Application No. PCT/CA2021/051681, 10 pages.

* cited by examiner

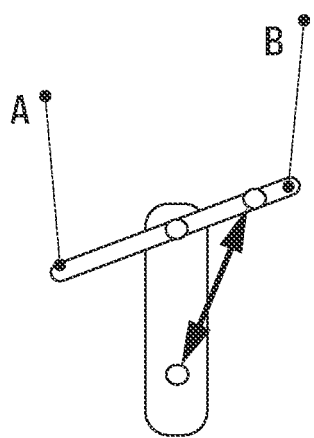
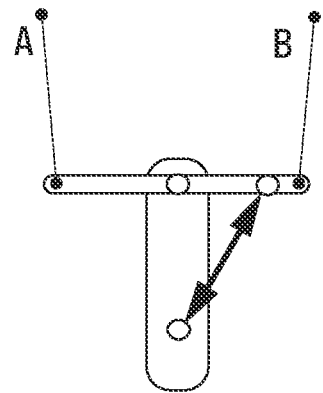
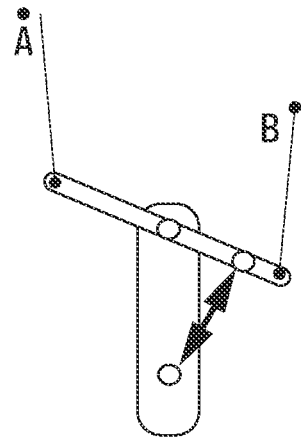
FIG. 15A     FIG. 15B     FIG. 15C
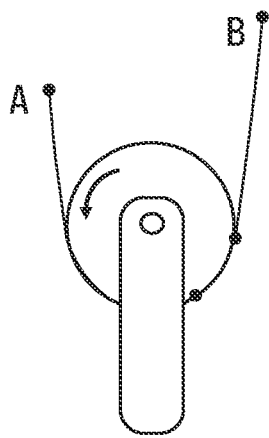
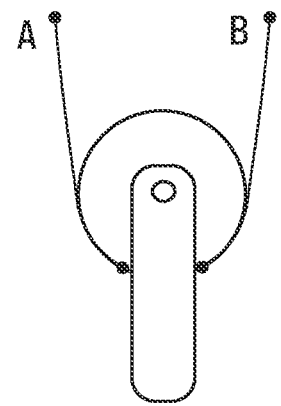
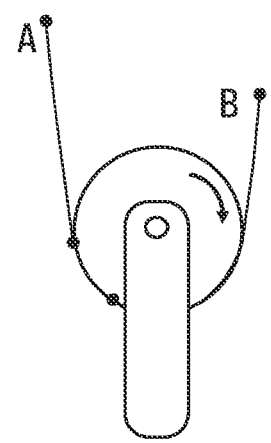
FIG. 16A     FIG. 16B     FIG. 16C

APPARATUS AND METHOD FOR OPERATING A GLIDING PARACHUTE/KITE

RELATED APPLICATION

This patent application is a continuation of U.S. patent application Ser. No. 17/535,299 filed Nov. 24, 2021, which claims priority to U.S. provisional patent application No. 63/198,941 filed Nov. 24, 2020, both of which being incorporated by reference herein in their entirety.

FIELD OF THE DISCLOSURE

This disclosure relates to parachutes/kites, and more particularly to gliding parachutes/kites.

BACKGROUND OF THE DISCLOSURE

A parachute is an apparatus having a surface used to slow a motion of a load (e.g. object being transported) through air by creating drag and/or lift to slow down the load and/or counteract gravitational force acting on the load. A kite is an apparatus having a surface that similarly reacts with air to create drag and/or lift, but its load includes a tether coupled to an object that is often on land and/or water.

A parachute can be used for transporting an object to a target location on a landing surface (e.g. ground or boat). Unfortunately, depending on conditions, the parachute can overshoot the target location. Also, there are other uses for parachutes where problems can emerge such as when gliding parachutes are constrained by airspace limitations or physical obstacles, such that turning to control trajectory or ground speed at touch down, may not be possible. Existing approaches for controlling trajectory of parachutes leave much to be desired.

Also, existing approaches for controlling trajectory of kites can consume a significant amount of space, often resulting in crashes when a kite cannot complete its maneuver without impacting a surface of the land and/or water.

There exists a need for an improved parachute/kite that can glide and be operated with improved control of trajectory.

SUMMARY OF THE DISCLOSURE

Disclosed is a gliding parachute/kite having a wing with a flexible material. The wing has a first transverse edge and a second transverse edge. The gliding parachute/kite also has a set of suspension lines adapted for coupling a load to the wing, such that the coupling is configurable in any one of a plurality of possible states based on relative lengths of the suspension lines. The possible states include a first state in which the wing is deformed during flight with more deformation towards the first transverse edge compared to the second transverse edge, thereby causing the first transverse edge to be a leading edge and the second transverse edge to be a trailing edge relative to a free stream.

In accordance with an embodiment of the disclosure, the possible states also include a second state in which the wing is deformed during flight with more deformation towards the second transverse edge compared to the first transverse edge, thereby causing the second transverse edge to be the leading edge and the first transverse edge to be the trailing edge relative to the free stream. In this way, the gliding parachute/kite is capable of reversing direction without having to turn around. Reversing direction can be used to improve control of trajectory.

In some implementations, the gliding parachute/kite is a gliding parachute configured to transport an object as part of the load. In other implementations, the gliding parachute/kite is a gliding kite configured to be tethered to an object as part of the load.

Also disclosed is a method of operating the gliding parachute/kite. The method involves gliding in a first direction, and reversing direction thereby gliding in a second direction opposite to the first direction without turning around the gliding parachute/kite. As noted above, reversing direction can be used to improve control of trajectory. For example, in the case of the gliding parachute/kite being a gliding parachute and the load is an object to be delivered to a target area, reversing direction can be used to land in the target area without having to turn around.

Also disclosed is a gliding parachute/kite having a wing with a flexible material. The wing has four corners including a first pair of diagonally opposing corners and a second pair of diagonally opposing corners. The gliding parachute/kite also has a set of suspension lines adapted for coupling a load to the wing, such that the coupling is configurable in any one of a plurality of possible states based on relative lengths of the suspension lines.

In accordance with an embodiment of the disclosure, the possible states include a first state in which the wing is deformed during flight with more deformation towards the first pair of diagonally opposing corners of the wing compared to the second pair of diagonally opposing corners of the wing, thereby causing the gliding parachute/kite to spin around an axis that is substantially orthogonal to the wing. This spinning can be used to improve control of trajectory.

In some implementations, the gliding parachute/kite is a gliding parachute configured to transport an object as part of the load. In other implementations, the gliding parachute/kite is a gliding kite configured to be tethered to an object as part of the load.

Also disclosed is a method of operating the gliding parachute/kite. The method involves gliding along a trajectory, and spinning around an axis that is substantially orthogonal to the wing thereby stopping the gliding and changing the trajectory. As noted above, this spinning can be used to improve control of the trajectory. For example, in the case of the gliding parachute/kite being a gliding parachute and the load is an object to be delivered to a target area, the spinning can be used to land in the target area without overshooting the target area. In addition to using spinning to avoid overshooting the target area, trajectory control can include resuming gliding, after halting spinning, for example in a purposefully specific direction.

Other aspects and features of the present disclosure will become apparent, to those ordinarily skilled in the art, upon review of the following description of the various embodiments of the disclosure.

BRIEF DESCRIPTION OF THE DRAWINGS

Embodiments will now be described with reference to the attached drawings in which:

FIGS. 15A to 15C are schematics of an example actuator system of the controller; and FIGS. 16A to 16C are schematics of another example actuator system of the controller.

DETAILED DESCRIPTION OF EMBODIMENTS

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Gliding Parachute/Kite

Figure 1:
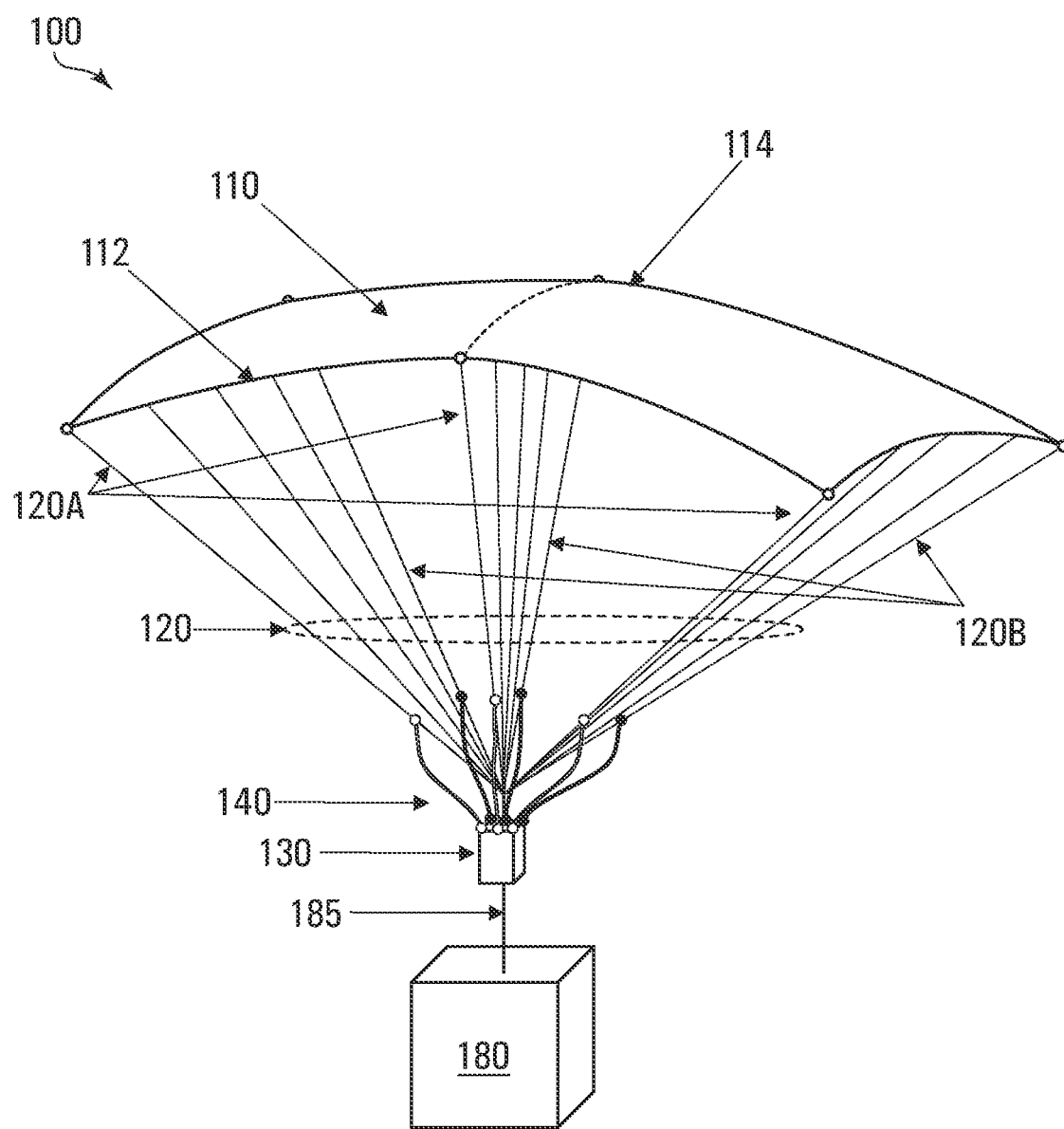
FIG. 1 is a perspective view of an example gliding parachute/kite, in accordance with an embodiment of the disclosure.
Figure 2:
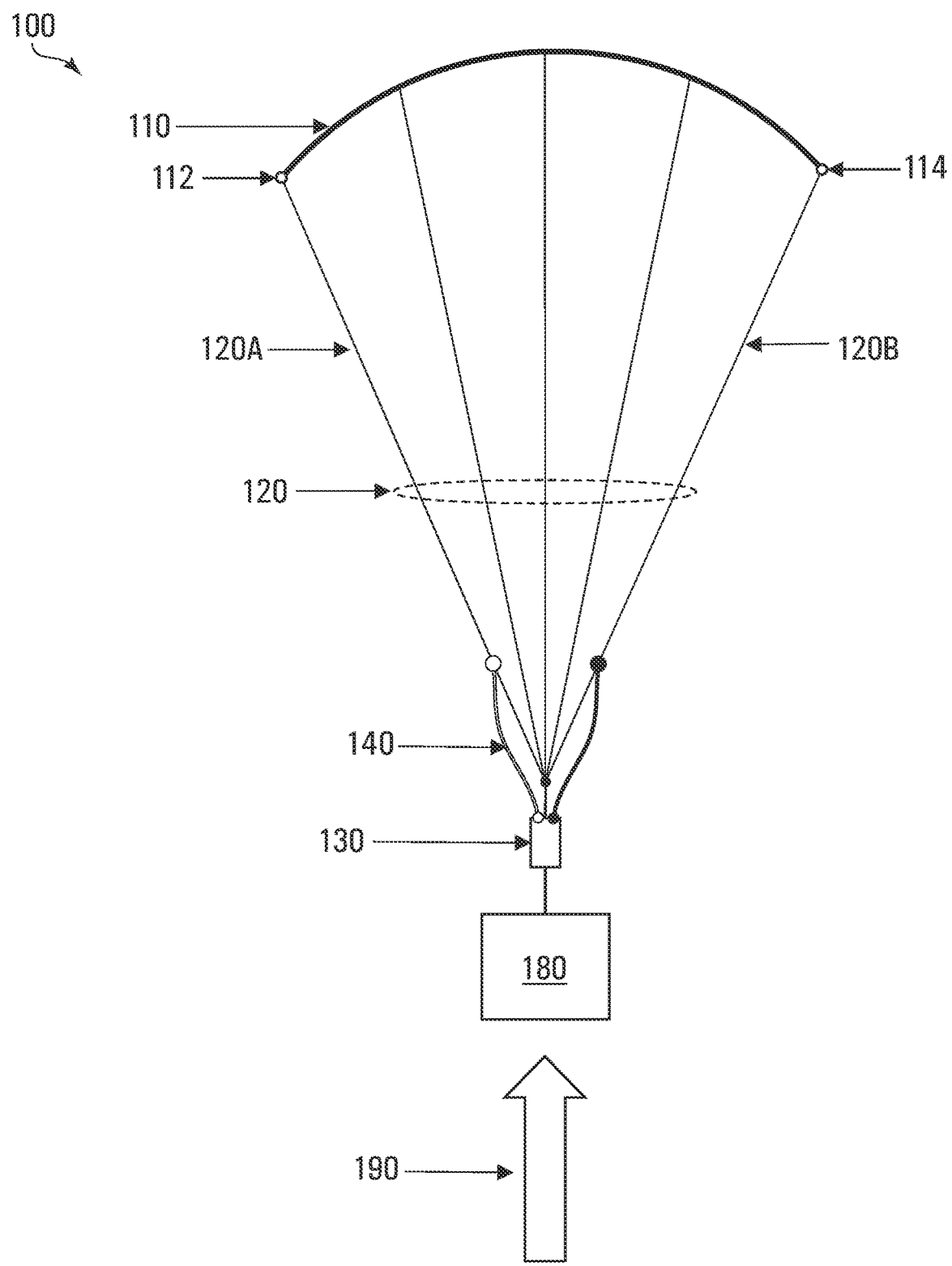
FIG. 2 is a side view of the gliding parachute/kite of FIG. 1.

Referring now to FIG. 1, shown is a perspective view of an example gliding parachute/kite 100, in accordance with an embodiment of the disclosure. Also referring to FIG. 2, shown is a side view of the gliding parachute/kite 100. The gliding parachute/kite 100 includes a wing 110 made of flexible material that is generally thin, such that the wing 110 has a thickness corresponding to a thickness of the flexible material. The wing 110 has a first transverse edge 112 and a second transverse edge 114. The gliding parachute/kite 100 also has a set of suspension lines 120 adapted for coupling a load 180 to the wing 110, such that the coupling is configurable in any one of a plurality of possible states based on relative lengths of the suspension lines 120.

In the illustrated example, the gliding parachute/kite 100 is a gliding parachute configured to transport an object as part of the load 180. A load path 185 connects the suspension lines 120 to the load 180. In other implementations, the gliding parachute/kite 100 is a gliding kite configured to be tethered to an object as part of the load 180 (not shown). Although the illustrated example and other illustrated examples provided herein generally focus on gliding parachutes, it is to be understood that embodiments of the disclosure are applicable to gliding kites as well, given that gliding parachutes and gliding kites are similar.

In the illustrated example, only three groups of suspension lines 120 are shown for clarity, including one in the middle and one on each outer side of the wing 110, but typically there can be five or more groups. Different numbers of groups of suspension lines 120 can be employed for different implementations. In the illustrated example, specific sets of suspension lines 120 are identified as line sets 120A and 120B, which are "controlled line sets", as they will have their lengths shortened or lengthened via control lines 140. In the illustrated example, the line sets 120A and 120B include all of the suspension lines 120 along the first transverse edge 112 and the second transverse edge 114, however variations are possible that do not include all the suspension lines 120 in the center of the wing 110 as part of the controlled line sets. In some implementations, line lengths for the controlled line sets 120A and 120B are modulated by a controller 130 using various methods including pulleys, levers and screw actuators, for example.

Figure 3:
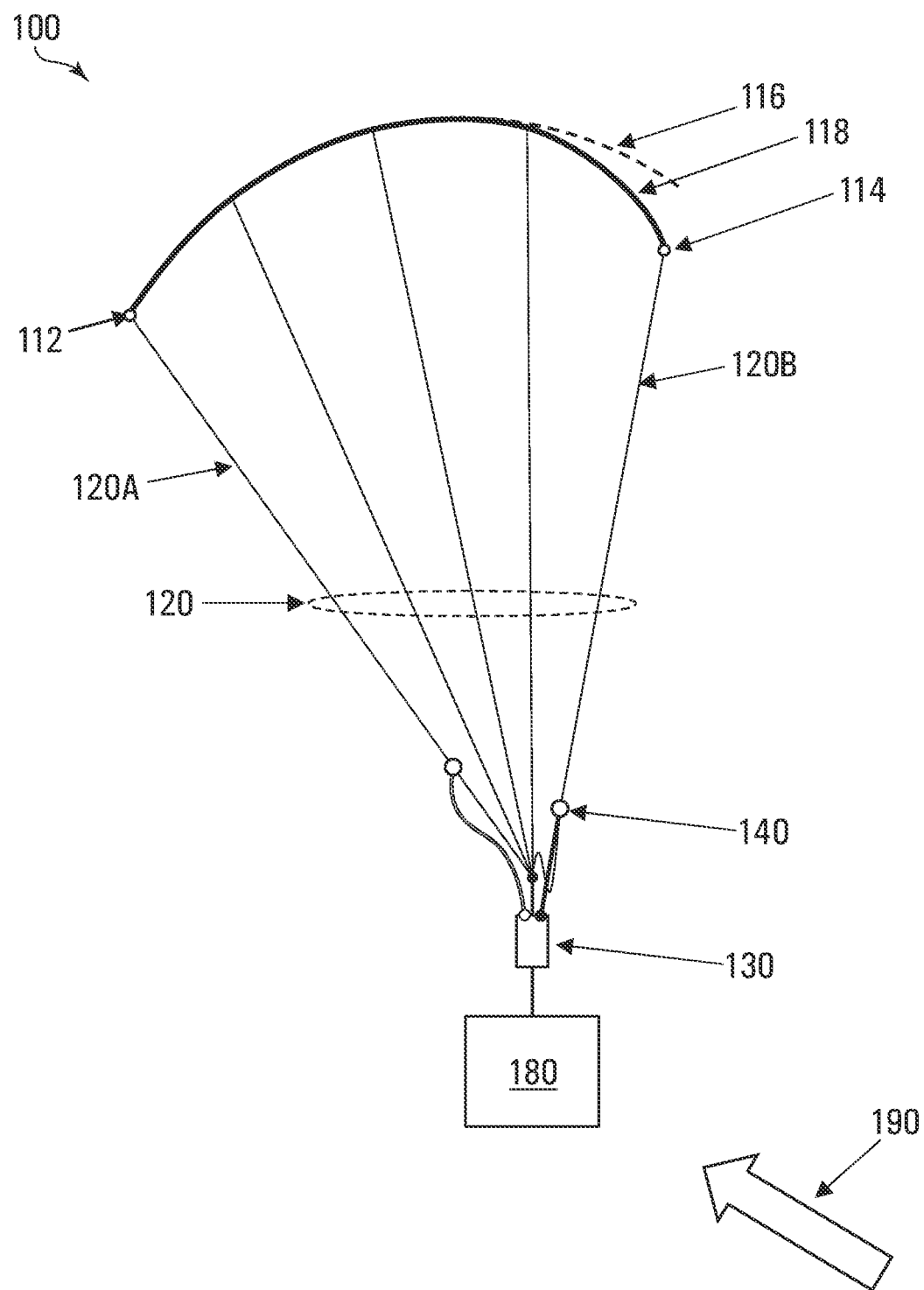
FIG. 3 is a side view of the gliding parachute/kite with more wing deformation towards a second transverse edge compared to a first transverse edge.

Referring now to FIG. 3, shown is a side view of the gliding parachute/kite 100 with more wing deformation 118 towards the second transverse edge 114 compared to the first transverse edge 112. In the illustrated example, a wing profile in side view is deformed from a nominal shape 116 resulting in generation of a net lift (i.e. a net aerodynamic force normal to the free stream 190). This is achieved by changing a shape on what will become a leading edge of the wing 110. This example shows a case where the shape is changed by shortening the suspension line set 120B. Shortening suspension line set 120B compared to line set 120A causes the gliding parachute/kite 100 to glide such that the second transverse edge 114 (i.e. edge of the gliding parachute/kite 100 with line set 120B) becomes the leading edge of the wing 110 when gliding.

Figure 4:
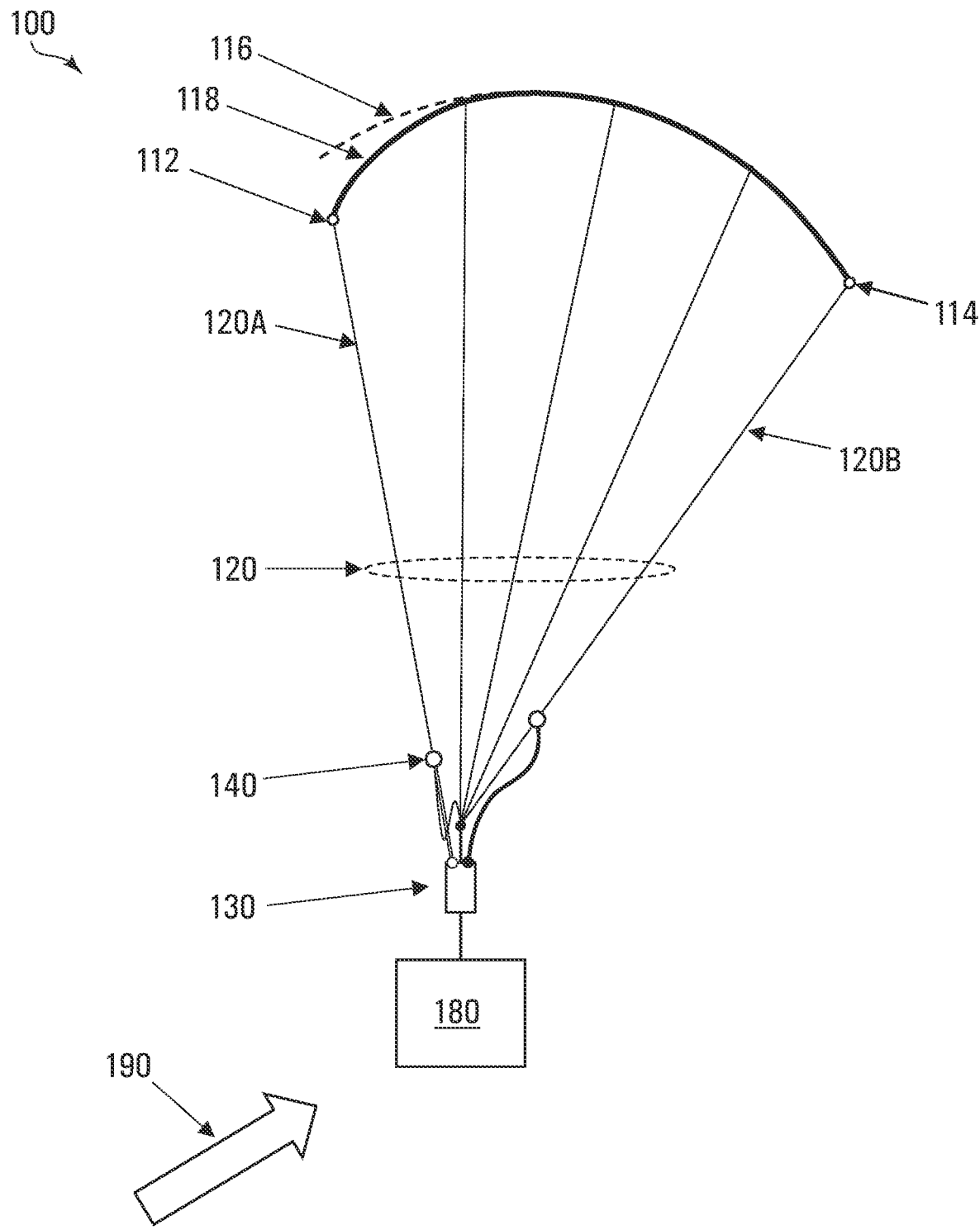
FIG. 4 is a side view of the gliding parachute/kite with more wing deformation towards the first transverse edge compared to the second transverse edge.

Referring now to FIG. 4, shown is a side view of the gliding parachute/kite 100 with more wing deformation 118 towards the first transverse edge 112 compared to the second transverse edge 114. Shortening suspension line set 120A compared to line set 120B causes the gliding parachute/kite 100 to glide such that the first transverse edge 112 (i.e. edge of the gliding parachute/kite 100 with line set 120A) becomes the leading edge of the wing 110 when gliding. This is the opposite of what is shown in FIG. 3.

FIGS. 3 and 4 illustrate two possible states for the gliding parachute/kite 100: (i) a first state in which the wing 110 is deformed during flight with more deformation towards the first transverse edge 112 compared to the second transverse edge 114, thereby causing the first transverse edge 112 to be a leading edge and the second transverse edge 114 to be a trailing edge relative to a free stream 190, and (ii) a second state in which the wing 110 is deformed during flight with more deformation towards the second transverse edge 114 compared to the first transverse edge 112, thereby causing the second transverse edge 114 to be the leading edge and the first transverse edge 112 to be the trailing edge relative to the free stream 190.

In some implementations, the controller 130 controls the coupling of the load 180 to the wing 110 and controls transitioning between the possible states by manipulating a length of at least some of the suspension lines 120. In some implementations, for the first state, the controller 130 (i) shortens a first subset (e.g. line set 120A) of the suspension lines 120 that is connected to the wing 110 in a vicinity of the first transverse edge 112 and/or (ii) lengthens a second subset (e.g. line set 120B) of the suspension lines 120 that is connected to the wing 110 in a vicinity of the second transverse edge 114. In some implementations, for the second state, the controller 130 (i) shortens a second subset (e.g. line set 120B) of the suspension lines 120 that is connected to the wing 110 in a vicinity of the second transverse edge 114 and/or (ii) lengthens a first subset (e.g. line set 120A) of the suspension lines 120 that is connected to the wing 110 in a vicinity of the first transverse edge 112. In some implementations, the controller 130 manipulates lengths of the suspension lines 120 using the control lines 140 as depicted.

By supporting both of these states, the gliding parachute/kite 100 is capable of reversing direction without having to turn around. Reversing direction can be used to improve control of trajectory. In some implementations, the wing 110 is configured such that gliding is possible in either longitudinal direction in substantially the same way. For example, in some implementations, the wing 110 is substantially symmetrical such that a first half of the wing 110 having the first transverse edge 112 substantially mirrors a second half of the wing 110 having the second transverse edge 114. In some implementations, the wing 110 has four corners.

In some implementations, the wing 110 is configured to provide more lift than drag. For example, in some implementations, the wing 110 has an aspect ratio of wingspan to mean chord that is greater than one. This enables the gliding parachute/kite 100 to be capable of "gliding" through air with substantial lift. This distinguishes from conventional parachutes that do not glide with substantial lift because they are not configured to provide more lift than drag. Instead, conventional parachutes generally fall through the air and do not glide in the same way as in the gliding parachute/kite 100 described herein. Thus, as used herein, the term "gliding parachute/kite" refers to a parachute/kite that is configured to be able to glide through air with substantial lift.

Figure 5:
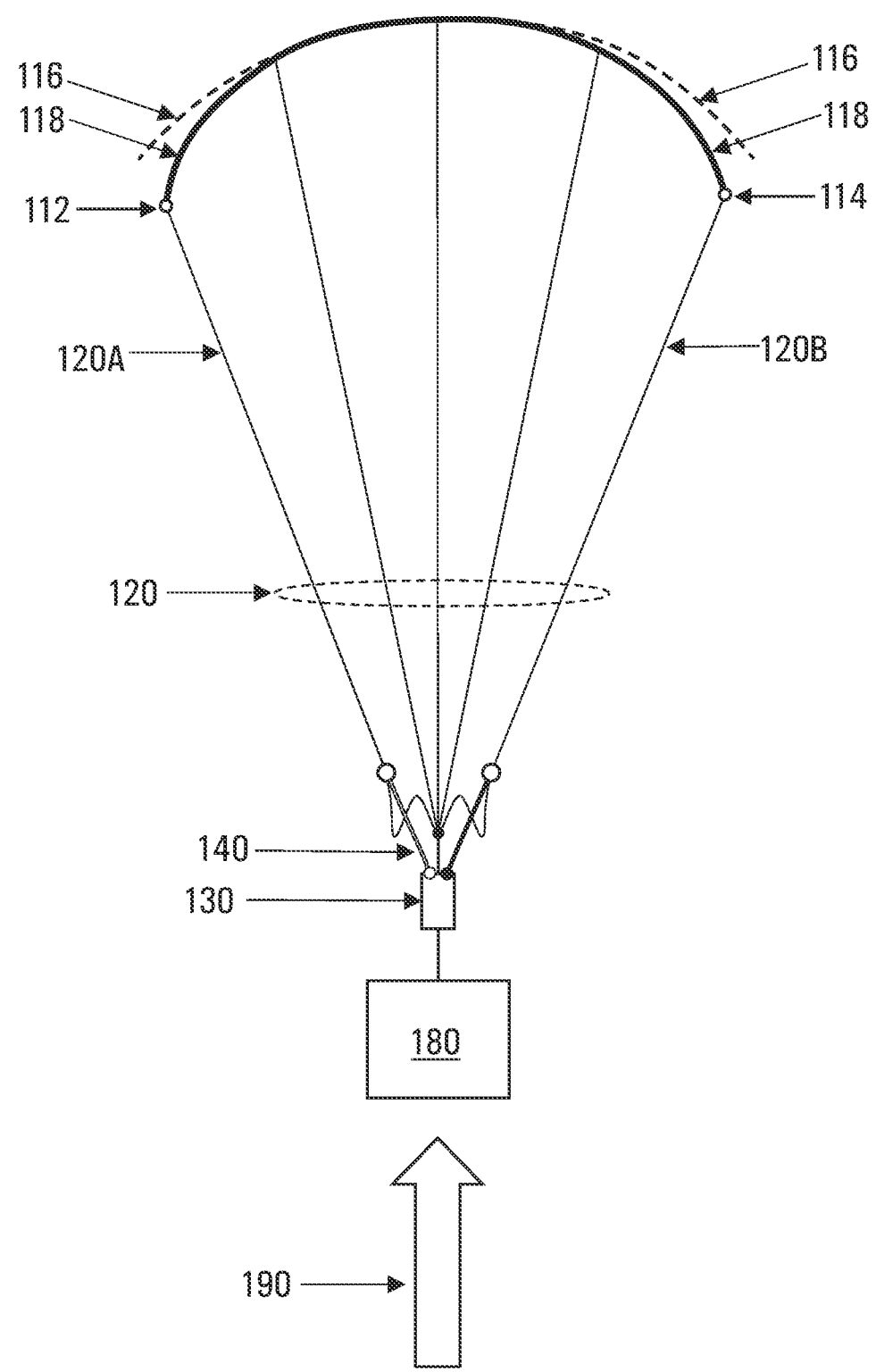
FIG. 5 is a side view of the gliding parachute/kite with wing deformation towards both the first and second transverse edges.

Referring now to FIG. 5, shown is a side view of the gliding parachute/kite 100 with wing deformation 118 towards both the first transverse edge 112 and the second transverse edge 114. In the illustrated example, a wing profile in side view is deformed from a nominal shape 116 during flight with a same amount of deformation 118 towards the first transverse edge 112 compared to the second transverse edge 114. The control lines 140 are acting equally on both suspension line sets 120A and 120B to create the deformation 118. Note that the control lines 140 can pull down line sets 120A and 120B after opening and prior to commencing glide. The wing profile generates "no net lift" (i.e. no net aerodynamic force normal to the free stream 190), so it falls vertically relative to air mass. One way of achieving this is to ensure the wing 110 has a symmetric shape about the free stream axis. However, there are other ways of achieving "no net lift" conditions without the wing 110 needing to be symmetric about the free stream axis. In this "no net lift" configuration, the gliding parachute/kite 100 is considered stopped since it has no lift and therefore no forward glide in any direction.

The examples described above involve increasing the deformation 118 towards the second transverse edge 114 (i.e. FIG. 3), the first transverse edge 112 (i.e. FIG. 4), and both the first transverse edge 112 and the second transverse edge 114 (i.e. FIG. 5). However, it is to be understood that other implementations are possible in which the deformation 118 is instead decreased. This concept is described below with reference to FIGS. 6 and 7.

Figure 6:
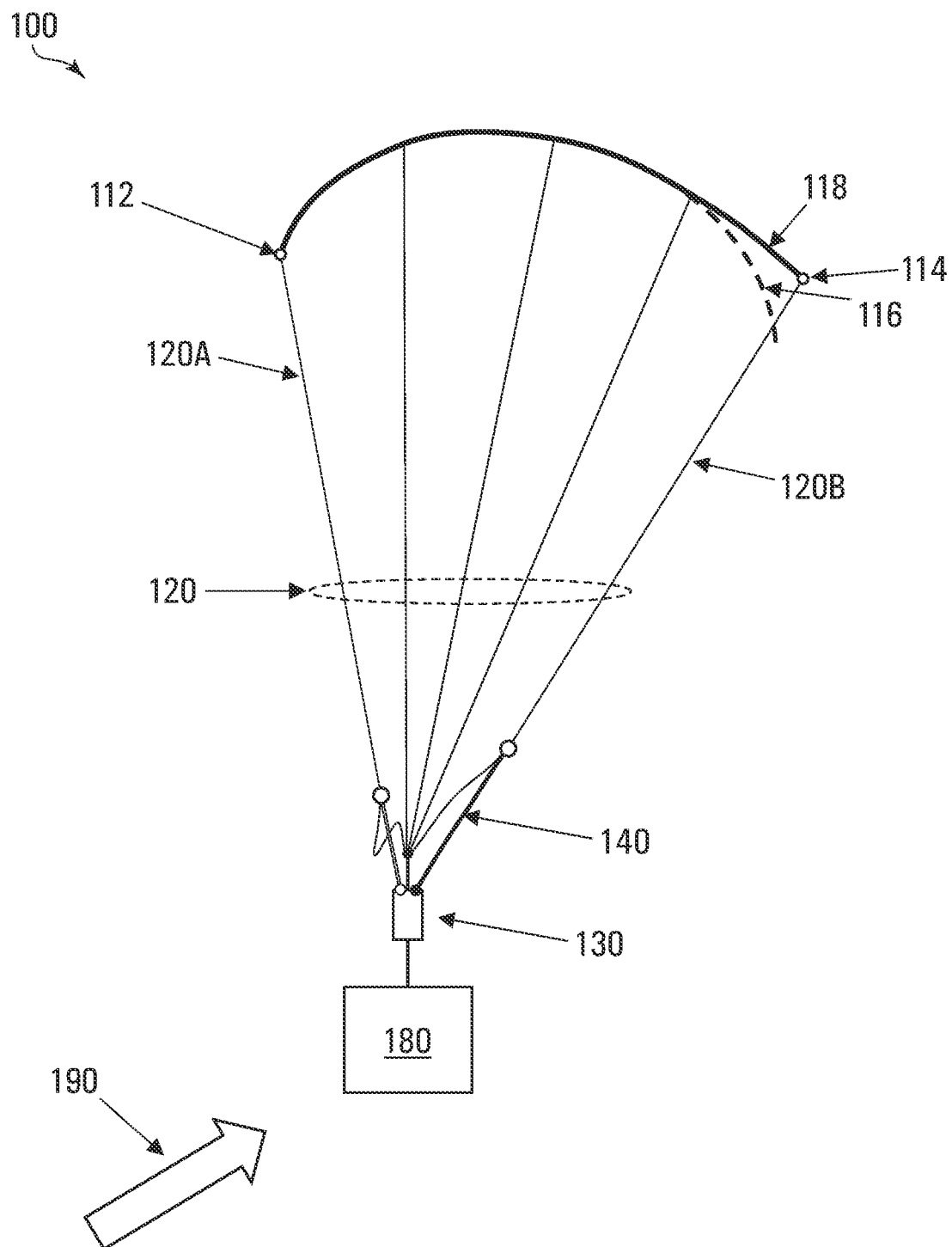
FIG. 6 is a side view of the gliding parachute/kite with more wing deformation towards the first transverse edge compared to the second transverse edge.

Referring now to FIG. 6, shown is a side view of the gliding parachute/kite 100 with more wing deformation towards the first transverse edge 112 compared to the second transverse edge 114. However, rather than increasing deformation towards the first transverse edge 112, deformation 118 towards the second transverse edge 114 is decreased from a nominal shape 116. In the illustrated example, a wing profile in side view is deformed resulting in generation of a net lift (i.e. a net aerodynamic force normal to the free stream 190). This can be achieved by changing a shape on what will become the trailing edge of the wing 110. This example shows a case where the shape is changed by lengthening the suspension line set 120B. Lengthening suspension line set 120B compared to line set 120A causes the gliding parachute/kite 100 to glide such that the second transverse edge 114 (i.e. edge of the gliding parachute/kite 100 with line set 120B) becomes the trailing edge of the wing 110 when gliding.

Figure 7:
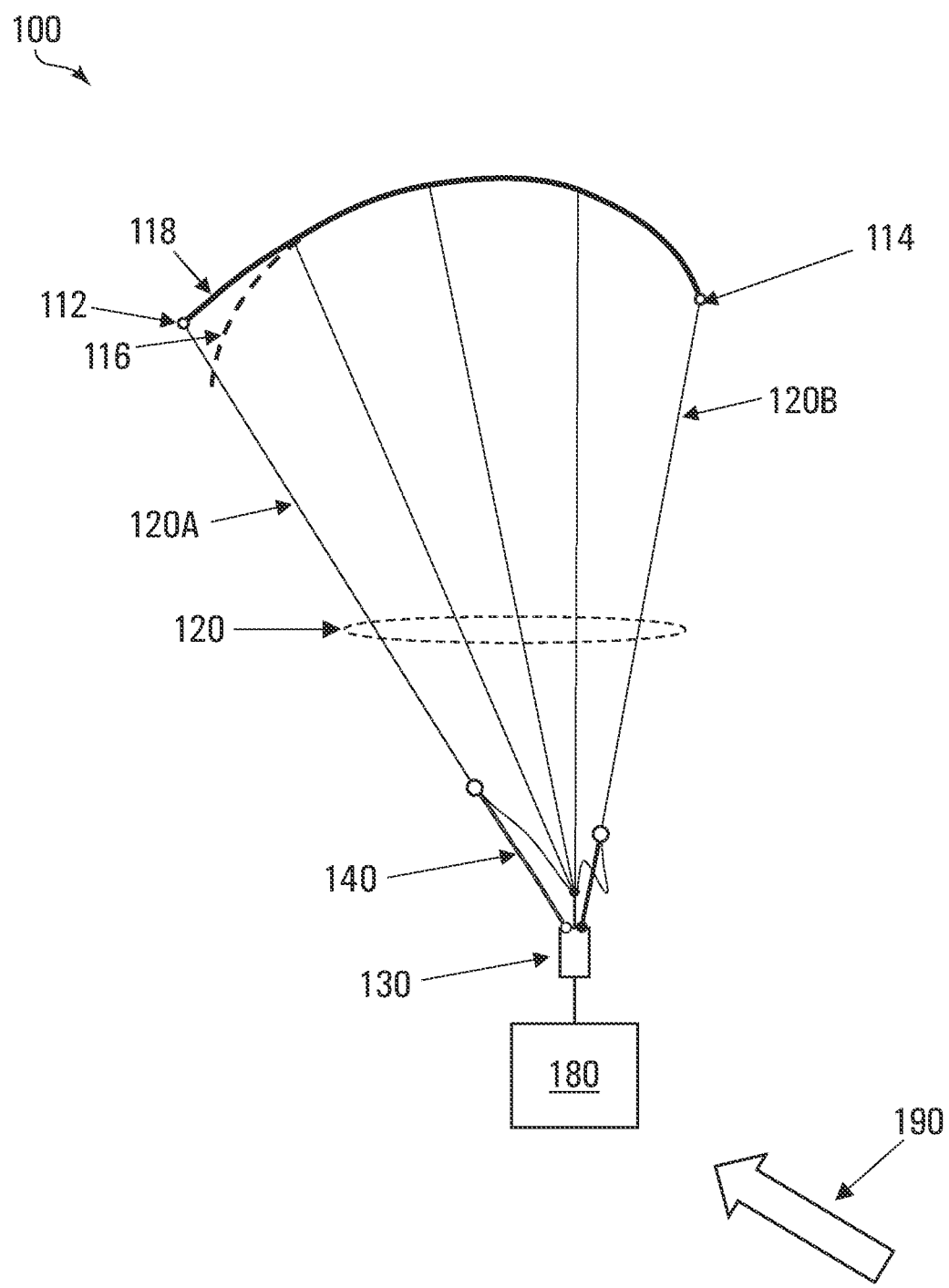
FIG. 7 is a side view of the gliding parachute/kite with more wing deformation towards the second transverse edge compared to the first transverse edge.

Referring now to FIG. 7, shown is a side view of the gliding parachute/kite 100 with more wing deformation towards the second transverse edge 114 compared to the first transverse edge 112. Lengthening suspension line set 120A compared to line set 120B causes the gliding parachute/kite 100 to glide such that the first transverse edge 112 (i.e. edge of the gliding parachute/kite 100 with line set 120A) becomes the trailing edge of the wing 110 when gliding. This is the opposite of what is shown in FIG. 6.

The examples described above involve the wing 110 having a concave shape such that the deformation is based on concavity. More deformation means more concavity, and conversely less deformation means less concavity. However, it is to be understood that other implementations are possible in which other shapes are possible for the wing 110. Also, while the examples described above involve positive concavity, other implementations are possible in which negative concavity (i.e. convexity) is involved. This concept is described below with reference to FIG. 8.

Figure 8:
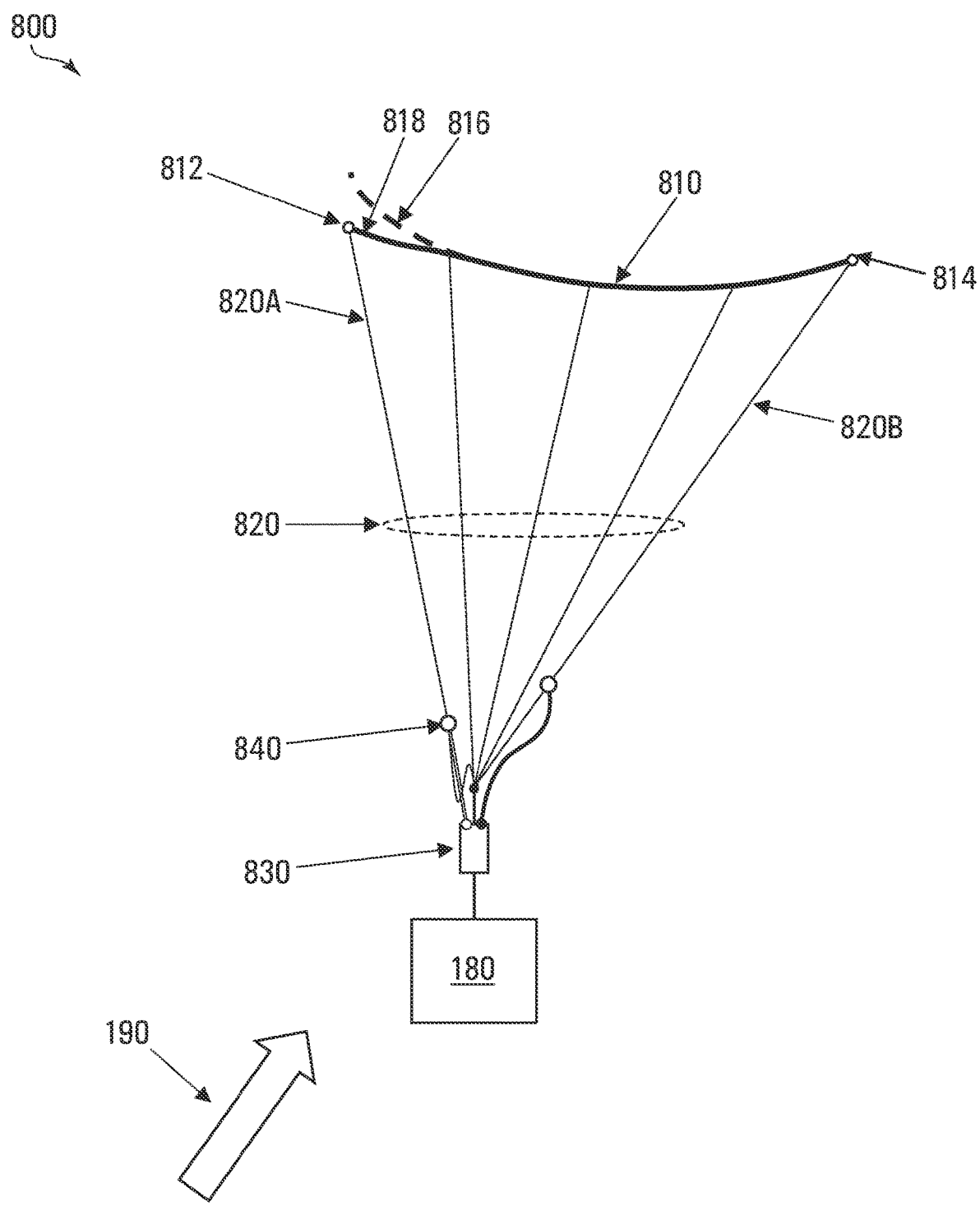
FIG. 8 is a side view of another gliding parachute/kite having a convex shape with more wing deformation towards a first transverse edge compared to a second transverse edge.

Referring now to FIG. 8, shown is a side view of another gliding parachute/kite 800 with a wing 810 having a convex shape with more wing deformation 118 towards a first transverse edge 812 compared to a second transverse edge 814. There is convexity (i.e. negative concavity) towards the first transverse edge 812 and the second transverse edge 814. However, the convexity is decreased or even eliminated towards the first transverse edge 812 (i.e. concavity is increased towards the first transverse edge 812). This example shows a case where the shape is changed by shortening the suspension line set 820A by a controller 830 pulling on a control line 840. Shortening suspension line set 820A compared to line set 820B causes the gliding parachute/kite 800 to glide such that the first transverse edge 812 (i.e. edge of the gliding parachute/kite 800 with line set 820A) becomes the leading edge of the wing 810 when gliding.

Method of Operation

Figure 9:
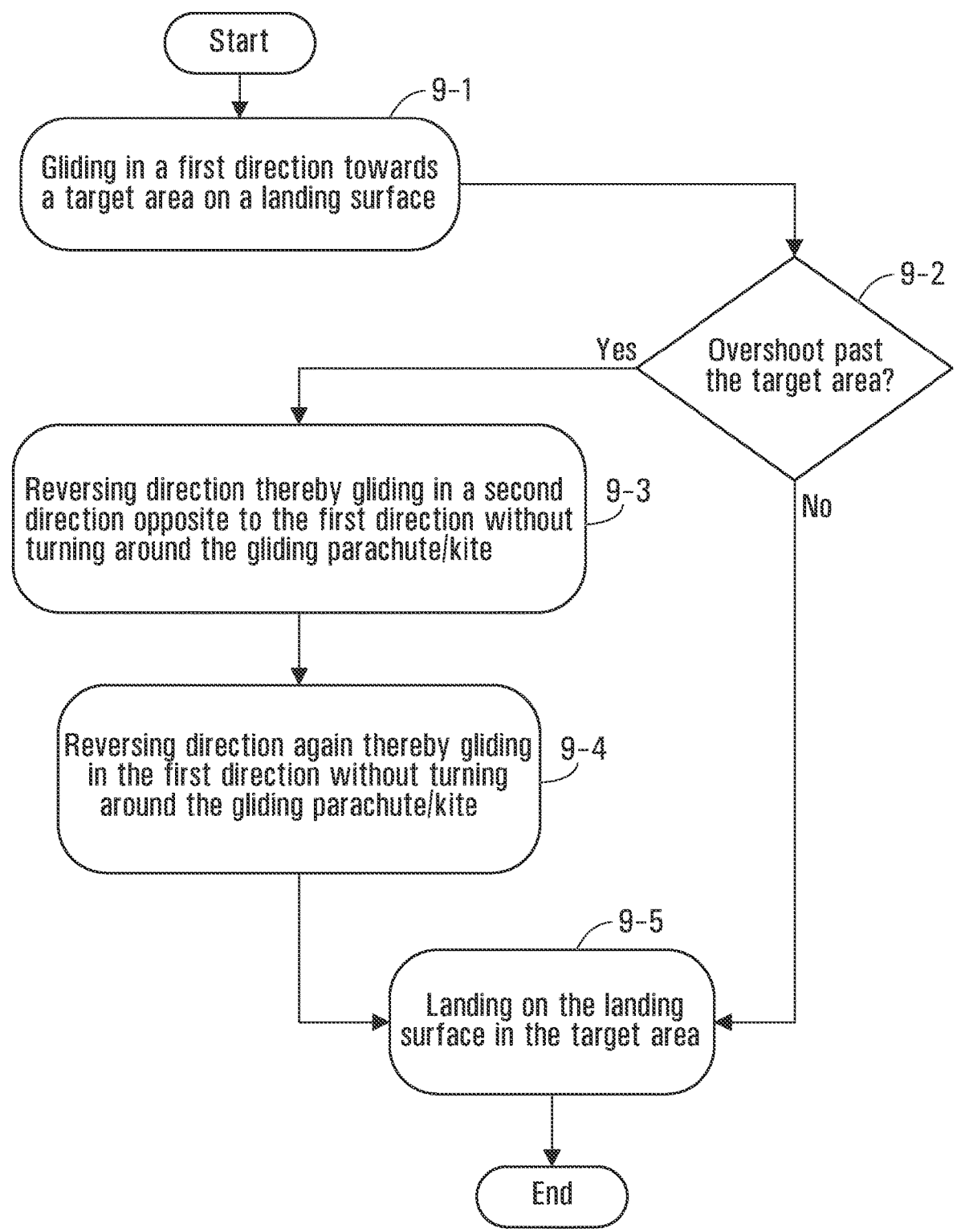
FIG. 9 is a flowchart of a method of landing on a landing surface in a target area.

Referring now to FIG. 9, shown is a flowchart of a method of landing on a landing surface (e.g. ground or boat) in a target area. This method can be executed by a gliding parachute, for example by the gliding parachute 100 of FIGS. 1 to 7 or by the gliding parachute 800 of FIG. 8. More generally, this method can be executed by any appropriately configured gliding parachute.

In some implementations, an initial operating state is selected prior to deployment of the gliding parachute. At step 9-1, the gliding parachute glides in a first direction towards the target area on the landing surface. In some implementations, the gliding parachute is carrying an object (e.g. supplies, rations, etc.) to be delivered to the target area.

If it is determined at step 9-2 that the gliding parachute will overshoot past the target area if the gliding parachute were to glide in the first direction towards the target area without any intervention, then at step 9-3 the gliding parachute reverses direction thereby gliding in a second direction opposite to the first direction without turning around the gliding parachute. In some implementations, as shown at step 9-4, the gliding parachute reverses direction again thereby gliding in the first direction without turning around the gliding parachute.

In some implementations, the gliding parachute executes both of the reversing of direction steps such that the overshoot past the target area is avoided. In some implementations, each reversing of direction step is executed to adjust a rate of descent and/or a touch down time. Finally, at step 9-5 the gliding parachute lands on the landing surface in the target area.

Figure 10A:
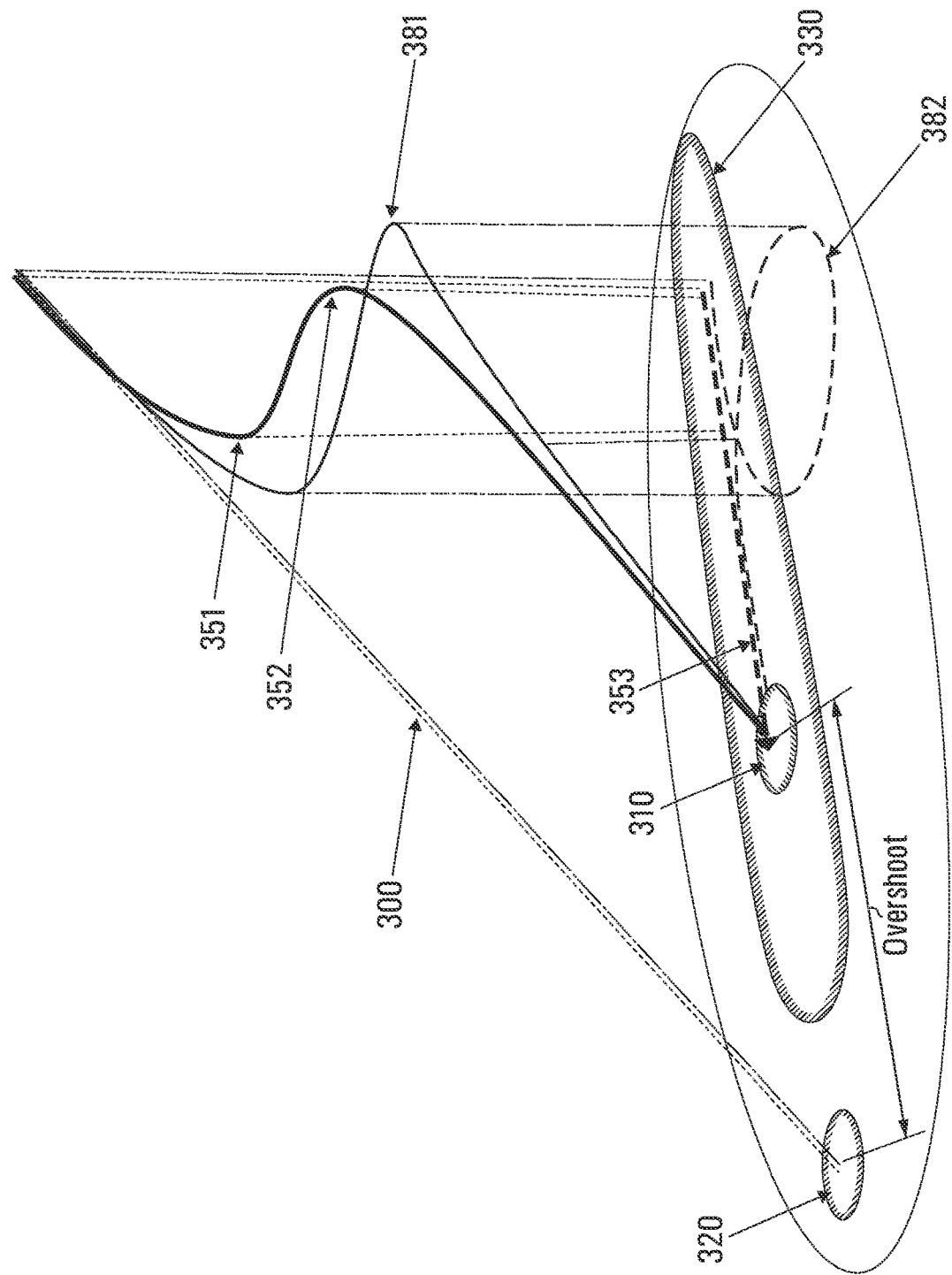
FIG. 10A is a perspective view of example trajectories of the gliding parachute/kite.
Figure 10B:
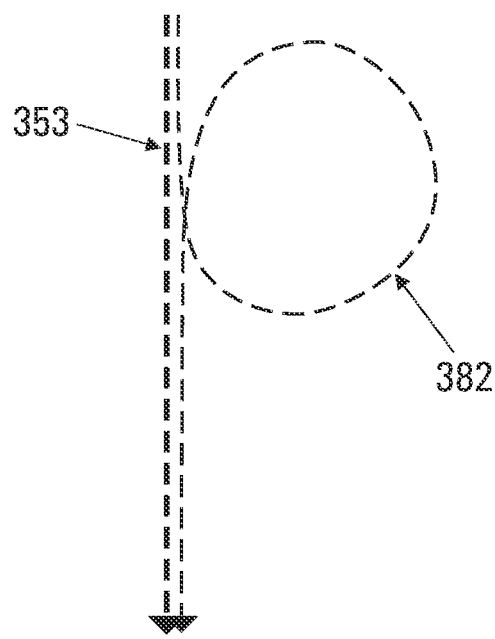
FIG. 10B is a top view of those trajectories.

Referring now to FIG. 10A, shown is a perspective view of example trajectories of the gliding parachute. FIG. 10B shows a top view of those trajectories. Without any corrective action, the gliding parachute would follow a straight trajectory 300 that overshoots past a target area 310 and lands in an incorrect spot 320. One approach is for the gliding parachute to turn around completely (i.e. 360 degree turn) as shown by looped trajectory 381 with a view to land in the target area 310. However, this results in deviating from a permitted overflight area 330 as shown by looped projection 382 of the looped trajectory 381 onto earth for flight path. An improved approach incorporates corrective action, including a first reversal 351 and a second reversal 352 as similarly described above with reference to FIG. 9, with a view to land in the target area 310. In this way, it is possible for the gliding parachute to land in the target area 310 without any deviation from the permitted overflight area 330 as shown by reversal projection 353 of the trajectory onto earth for flight path.

Although the corrective action has been described to include multiple reversals (i.e. the first reversal 351 and the second reversal 352), it is noted that it is possible in some cases to have a single reversal while still minimizing or avoiding an overshoot from the target area 310 and while minimizing or avoiding any deviation from the permitted overflight area 330. In other cases, more than two reversals can be performed as desired. Much depends on a size of the target area 310, a size of the permitted overflight area 330, and wind.

Also, although the corrective action has been described in relation to a gliding parachute landing in a target area, it is noted that other scenarios are possible which can include a gliding kite reversing direction for some other purpose. More generally, there is provided a method that involves a gliding parachute/kite gliding in a first direction and reversing direction thereby gliding in a second direction opposite to the first direction without turning around the gliding parachute/kite. This can be done for example to adjust a rate of descent and/or a touch down time, regardless of whether it is an object to land in a target area.

Another Gliding Parachute/Kite

Figure 11:
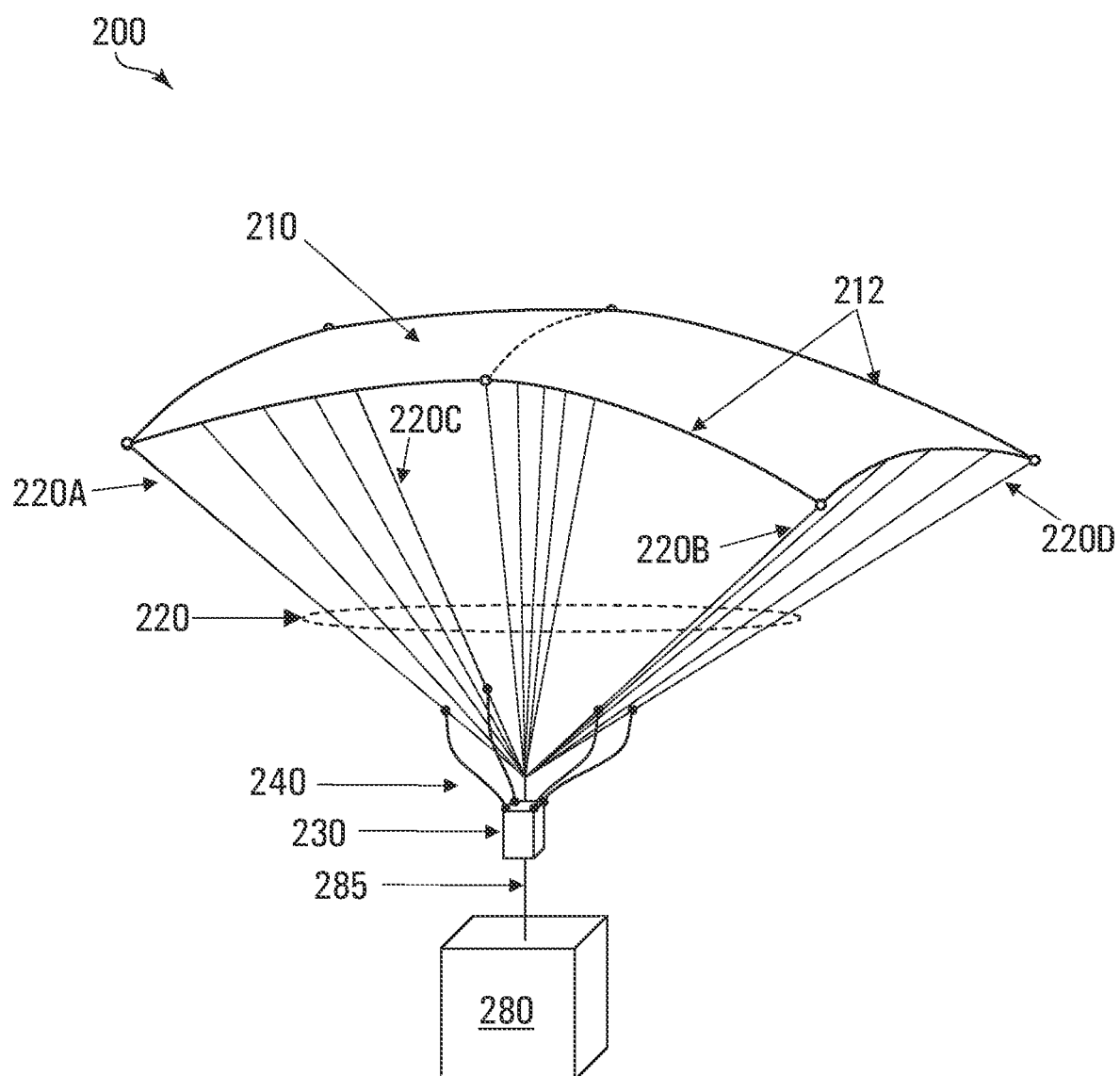
FIG. 11 is a perspective view of another example gliding parachute/kite, in accordance with an embodiment of the disclosure.

Referring now to FIG. 11, shown is a perspective view of another example gliding parachute/kite 200, in accordance with an embodiment of the disclosure. The gliding parachute/kite 200 includes a wing 210 made of flexible material that is generally thin, such that the wing 210 has a thickness corresponding to a thickness of the flexible material. The wing 210 has four corners including a first pair of diagonally opposing corners and a second pair of diagonally opposing corners. The gliding parachute/kite also has a set of suspension lines 220 adapted for coupling a load 280 to the wing 210, such that the coupling is configurable in any one of a plurality of possible states based on relative lengths of the suspension lines 220.

In the illustrated example, the gliding parachute/kite 200 is a gliding parachute configured to transport an object as part of the load 280. A load path 285 connects the suspension lines 220 to the load 280. In other implementations, the gliding parachute/kite 200 is a gliding kite configured to be tethered to an object as part of the load 280 (not shown). Although the illustrated example and other illustrated examples provided herein generally focus on gliding parachutes, it is to be understood that embodiments of the disclosure are applicable to gliding kites as well, given that gliding parachutes and gliding kites are similar.

In the illustrated example, only three groups of suspension lines 220 are shown for clarity, including one in the middle and one on each outer side of the wing 210, but typically there can be five or more groups. Different numbers of groups of suspension lines can be employed for different implementations. In the illustrated example, specific sets of suspension lines are identified as line sets 220A, 220B, 220C and 220D, which are "controlled line sets", as they will have their lengths shortened or lengthened via control lines 240. In the illustrated example, each controlled line 240 is attached to a specific corner, however variations are possible where multiple lines in each corner area are controlled as part of the identified line, as a set. In some implementations, line lengths for the controlled line sets 220A to 220D are modulated by a controller 230 using various methods including pulleys, levers and screw actuators, for example.

Figure 12:
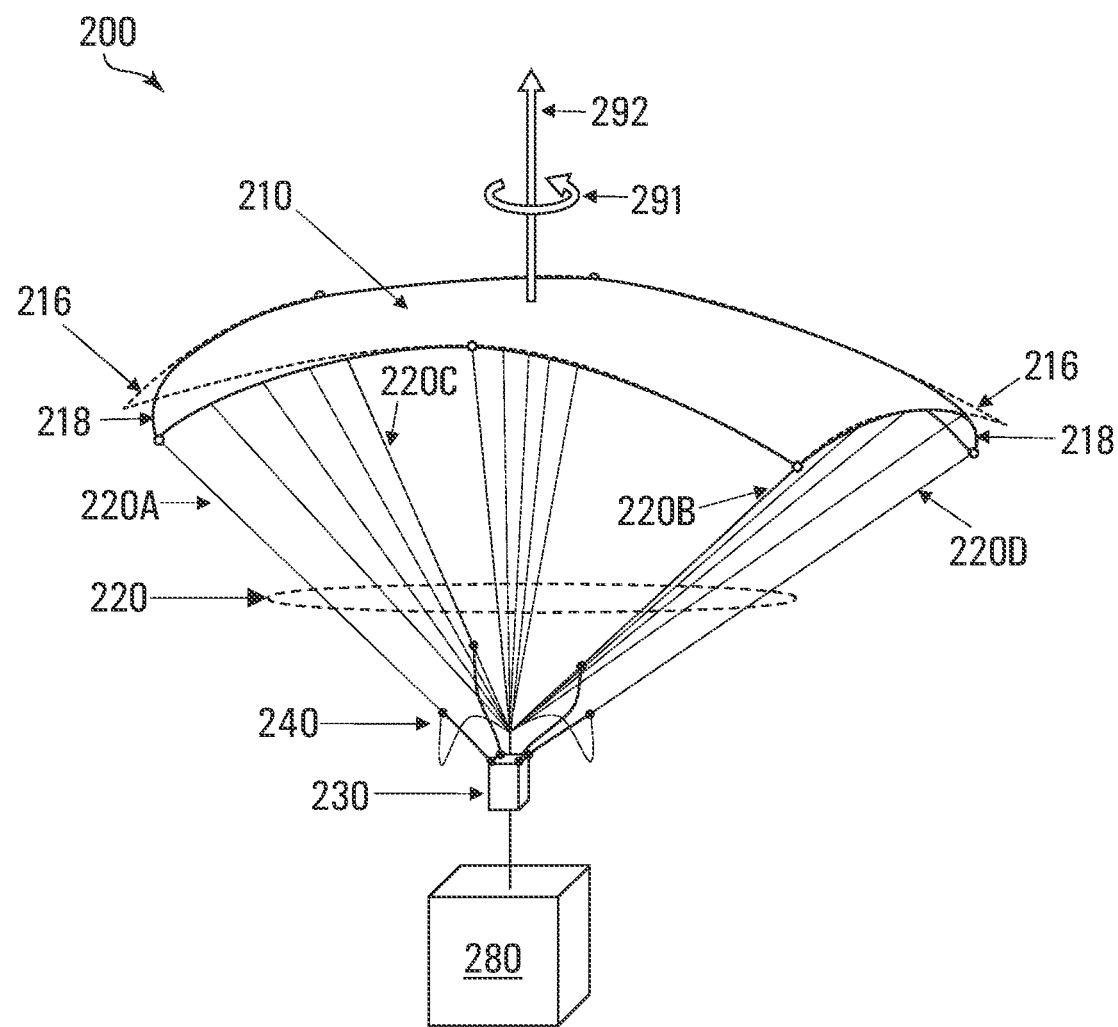
FIG. 12 is a perspective view of the gliding parachute/kite of FIG. 11 with more wing deformation towards a first pair of diagonally opposing corners compared to a second pair of diagonally opposing corners.

Referring now to FIG. 12, shown is a perspective view of the gliding parachute/kite 200 of FIG. 11 with more wing deformation 218 towards a first pair of diagonally opposing corners compared to a second pair of diagonally opposing corners. Spinning can be initiated either from a gliding state, or while forward glide is stopped. Spinning is initiated by deforming the wing in opposing corners from a nominal shape 216, by shortening lines from diagonally opposing corners (e.g. lines 220A and 220D, or lines 220B and 220C). When lines 220A and 220D are shortened (compared to lines 220B and 220C), the wing 210 will spin 291 counter clockwise when viewed from the top, about an axis 292 that is substantially orthogonal to the wing 210. This axis 292 normally passes through or close to the load 280. Conversely, when lines 220B and 220C are shortened (compared to lines A and D), the wing 210 will spin clockwise when viewed from the top. In some implementations, an amount of shortening is varied to modulate the spin rate. The spin rate is modulated to slow or speed up a rate of fall.

FIG. 12 illustrates a possible state for the gliding parachute/kite 200: (i) a spinning state in which the wing 210 is deformed during flight with more deformation towards the first pair of diagonally opposing corners of the wing compared to the second pair of diagonally opposing corners of the wing, thereby causing the gliding parachute/kite 200 to spin 291 around the axis 292 that is substantially orthogonal to the wing 210. This spinning state can be used to improve control of trajectory.

In some implementations, the controller 230 controls the coupling of the load 280 to the wing 210 and controls transitioning between the possible states by manipulating a length of at least some of the suspension lines 220. In some implementations, for the spinning state, the controller 230 shortens a first subset (e.g. lines 220A and 220D) of the suspension lines 220 that is connected to the wing 210 in a vicinity of each opposing corner of the first pair of diagonally opposing corners and/or (ii) lengthens a second subset (e.g. lines 220B and 220C) of the suspension lines 220 that is connected to the wing 210 in a vicinity of each opposing corner of the second pair of diagonally opposing corners.

By supporting this spinning state, the gliding parachute/kite 200 is capable of slowing down or speeding up a rate of fall. Spinning can be used to improve control of trajectory. In some implementations, the wing 210 is configured such that each half of the wing 210 can glide in opposing directions in substantially the same way. For example, in some implementations, the wing 210 is substantially symmetrical such that the first pair of diagonally opposing corners is substantially equivalent to the second pair of diagonally opposing corners.

In some implementations, there is provided a second state in which the wing 210 has substantially a same deformation towards the first pair of diagonally opposing corners of the wing 210 compared to the second pair of diagonally opposing corners of the wing 210, thereby avoiding the gliding parachute/kite 210 from spinning.

In some implementations, the wing 210 is configured to provide more lift than drag. For example, in some implementations, the wing 210 has an aspect ratio of wingspan to mean chord that is greater than one. This enables the gliding parachute/kite 210 to be capable of "gliding" through air with substantial lift. This distinguishes from conventional parachutes that do not glide with substantial lift because they are not configured to provide more lift than drag. Instead, conventional parachutes generally fall through the air and do not glide in the same way as in the gliding parachute/kite described herein. Thus, as used herein, the term "gliding parachute/kite" refers to a parachute/kite that is configured to be able to glide through air with substantial lift.

The examples described above involve a generally thin wing having a concave shape such that the deformation is based on concavity. More deformation means more concavity, and conversely less deformation means less concavity. However, it is to be understood that other implementations are possible in which other shapes are possible for the wing. Also, while the examples described above involve positive concavity, other implementations are possible in which negative concavity (i.e. convexity) is involved. This concept has been described above with reference to FIG. 8 and is not repeated here. In addition, these concepts apply to wings which may not be of uniform thickness or generally thin, and to shapes built up with multiple adjacent or non-adjacent layers of materials.

Another Method of Operation

Figure 13:
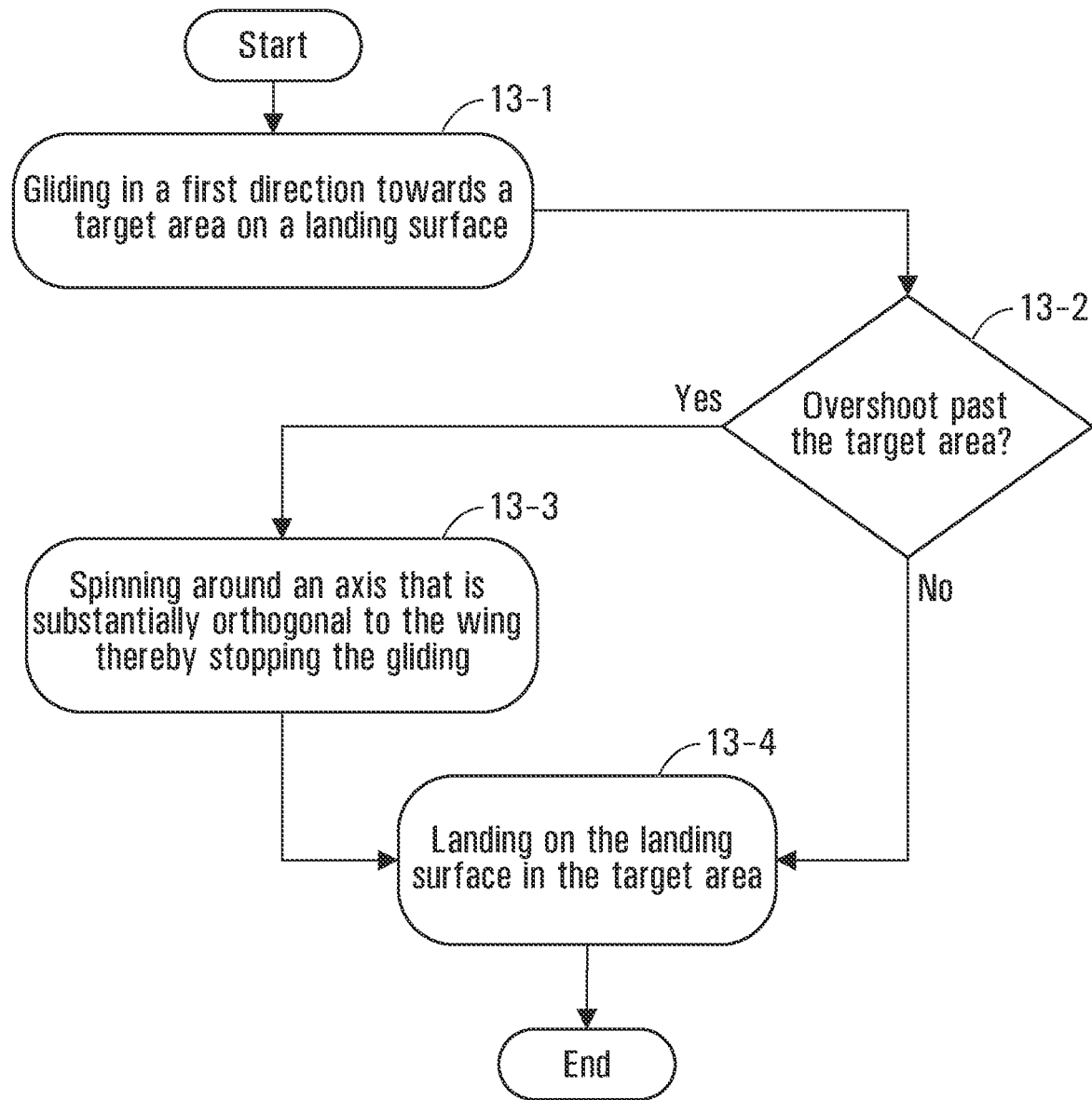
FIG. 13 is a flowchart of another method of landing on a landing surface in a target area.

Referring now to FIG. 13, shown is a flowchart of another method of landing on a landing surface (e.g. ground or boat) in a target area. This method can be executed by a gliding parachute, for example by the gliding parachute 200 of FIGS. 11 and 12. More generally, this method can be executed by any appropriately configured gliding parachute.

In some implementations, an initial operating state is selected prior to deployment of the gliding parachute. At step 13-1, the gliding parachute glides in a first direction towards the target area on the landing surface. In some implementations, the gliding parachute is carrying an object (e.g. supplies, rations, etc.) to be delivered to the target area.

If it is determined at step 13-2 that the gliding parachute has a trajectory that will overshoot past the target area if the gliding parachute were to glide in the first direction towards the target area without any intervention, then at step 13-3 the gliding parachute spins around an axis that is substantially orthogonal to the wing thereby stopping the gliding and steepening the trajectory.

In some implementations, the gliding parachute modulates the spinning such that the overshoot past the target area is avoided. In some implementations, the gliding parachute selects between spinning in a clockwise direction or a counter-clockwise direction. Finally, at step 13-4 the gliding parachute lands on the landing surface in the target area.

Although the corrective action has been described in relation to a gliding parachute landing in a target area, it is noted that other scenarios are possible which can include a gliding kite spinning for some other purpose such as to reduce horizontal touch down velocity and risk of tumbling a load when landing in little or no wind. In addition, the spinning can be performed for trajectory control such that gliding is resumed after halting the spinning. This can be implemented for example to resume gliding in a purposefully specific direction. More generally, there is provided a method that involves a gliding parachute/kite gliding along a trajectory, and spinning around an axis that is substantially orthogonal to the wing thereby stopping the gliding and changing the trajectory, and returning to gliding, and repeating these maneuvers.

Controller

The examples described above with reference to FIGS. 1 to 10 include reversing direction states, while the examples described above with reference to FIGS. 11 to 13 include spinning states. It is to be understood that embodiments of the disclosure include a gliding parachute/kite that supports all of these states. In addition, operation in a conventional fashion (e.g. changing trajectory and/or reversing direction by turning) is also possible. Thus, there is disclosed a gliding parachute/kite that can (i) reverse direction without turning around, (ii) spin around an axis that is substantially orthogonal to the wing, and/or (iii) operate in a conventional fashion (e.g. changing trajectory and/or reversing direction by turning), independently or in combination. As similarly described above, in some implementations, the controller controls the coupling of the load to the wing and controls transitioning between all of the possible states by manipulating a length of at least some of the suspension lines. Example details of the controller are provided below with reference to FIGS. 14 to 16.

Figure 14:
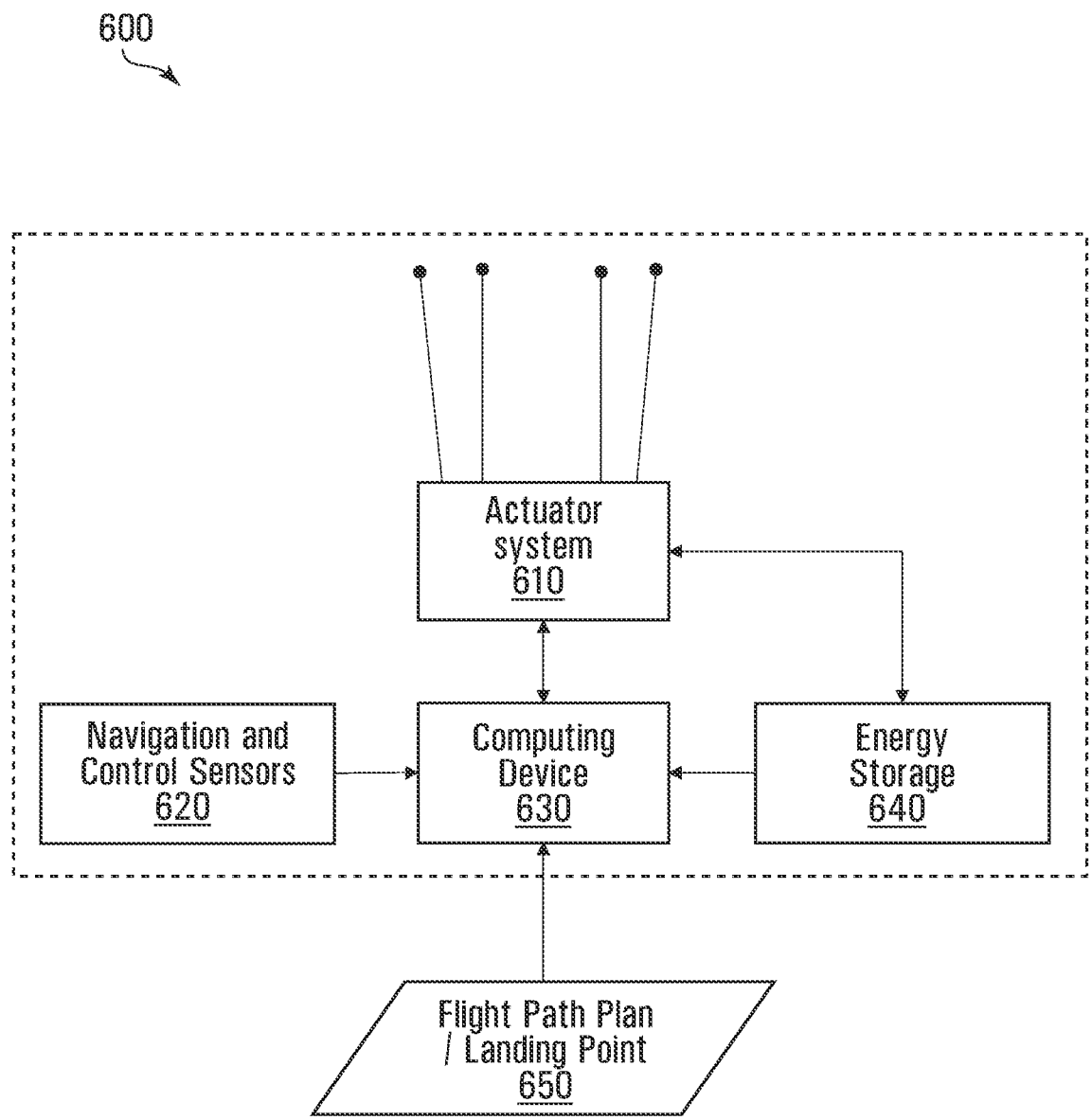
FIG. 14 is a block diagram of a controller for use with a gliding parachute/kite, in accordance with an embodiment of the disclosure.

Referring now to FIG. 14, shown is a block diagram of a controller 600 for use with a gliding parachute/kite, in accordance with an embodiment of the disclosure. The controller 600 has an actuator system 610, which is configured to shorten and lengthen lines as commanded. In some implementations, the controller 600 also has navigation and control sensors 620 to produce sensor readings, and a computing device 630 configured to command the actuator system 610 to follow a flight path plan 650 and/or to land on a specified landing point based on the sensor readings.

There are many possibilities for the navigation and control sensors 620. In some implementations, the sensor readings enable the computing device 630 to determine position and velocity relative to the earth. In some implementations, the sensor readings also enable the computing device 630 to determine height above terrain, airspeed, and/or related angle (i.e. angle of attack, sideslip). The navigation and control sensors 620 can include any suitable combination of sensors to produce the sensor readings.

In some implementations, the actuator system 610 and the computing device 630 are coupled to an energy storage 640. The energy storage 640 can be separate energy storages or one common energy storage for both the actuator system 610 and the computing device 630. There are many possibilities for the energy storage 640. In some implementations, the energy storage 640 is an electrical energy storage such as a battery, although other electrical energy storages are possible such as a capacitor. In some implementations, the energy storage 640 can also absorb energy (i.e. be charged) when energy is generated from line actuation. Such implementations may utilize a generator (not shown) for charging the energy storage 640.

There are many possibilities for the actuator system 610. The actuator system 610 is a mechanical apparatus that can shorten and lengthen lines upon command, using stored energy of various forms including but not limited to electrical (preferred), gravitational potential energy, hydraulic energy or pneumatic energy (or combinations of the above). The actuator system 610 can include (but not limited to) various configurations from simplest to most complex as follows:

i. Two lines which can be controlled independently (i.e. either of the lines can be lengthened or shortened by various amounts, independently from the other);
  ii. Two lines which can be controlled independently (i.e. both lengthened or both shortened or one shortened and one lengthened, all by various amounts);
  iii. Three lines, one of which can be controlled individually in addition to either a line pair controlled together (as per item i.) or two lines controlled individually (as per item ii.);
  iv. Four lines, with two pairs of lines which can be controlled as individual pairs, with each pair controlled together (two pairs each as per item ii.);
  v. Four lines, with one pair of lines which can be controlled together (as per item i.) and two lines which can be controlled individually from one another (as per item ii.) and the pair of lines;
  vi. Four lines which can be controlled independently (i.e. any of the lines can be lengthened or shortened by various amounts, independently from the others); and
  vii. Can include other configurations as well, and can include more than four lines.

The actuator system 610 can use various forms of mechanical devices including but not limited to:

i. Electric motors (linear and rotary) with or without reduction drives,
  ii. Hydraulic or pneumatic motors with or without reduction drives, and
  iii. Hydraulic or pneumatic cylinders, pneumatic muscles (i.e. linear actuators).

The actuator system 610 can use various means of converting rotary or linear actuators into linear line pulls, or to slow down or speed up actuators, including but not limited to:

i. Pulleys, Levers, Ramps, Bow Strings, or Combinations.

In some implementations, the controller 600 includes a lever configured to pivot about a point and having two opposing ends including a first end coupled to the first subset of the suspension lines and a second end coupled to the second subset of the suspension lines, and an actuator configured to move the lever. Example implementation details of a lever are provided below with reference to FIGS. 15A to 15C.

Referring now to FIGS. 15A to 15C, shown are schematics of an example actuator system of the controller 600. A lever and linear actuator can operate to shorten line A and lengthen line B (FIG. 15A), provide equal lengths for lines A and B (FIG. 15B), and lengthen line A and shorten B (FIG. 15C). In the illustrated example, one pair of lines A and B is controlled together using the lever and linear actuator, which may be preferred for smaller systems. However, a four-line system offers a full capability to both change direction of glide, and to initiate and control a spin, and may be used in conjunction with any number of existing methods and apparatus to steer the gliding parachute/kite once gliding in a given direction.

In some implementations, the four-line system involves two x two line pairs controlled together. When two lines can be controlled together, then a common pulley or common lever arm works well. In the illustrated example, shown is a lever design with a linear actuator that tilts the lever bar one way or another. Although only one pair of lines is shown, two of these can be used to have two independently controlled line pairs. The first two line pair is uses to deform the parachute to control direction of glide and to stop forward glide. The second two line pair is used to and modulate the spin.

In some implementations, the controller 600 includes a pulley having a wheel supporting movement of a drive element (e.g. cable, cord, wire, chain, etc.) having two opposing ends including a first end coupled to the first subset of the suspension lines and a second end coupled to the second subset of the suspension lines, and an actuator configured to rotate the wheel. Example implementation details of a pulley are provided below with reference to FIGS. 16A to 16C.

Referring now to FIGS. 16A to 16C, shown are schematics of another example actuator system of the controller 600. A pulley and rotary actuator can operate to shorten line A and lengthen line B (FIG. 16A), provide equal lengths for lines A and B (FIG. 16B), and lengthen line A and shorten B (FIG. 16C). In the illustrated example, one pair of lines A and B is controlled together using the pulley and rotary actuator, which may be preferred for larger systems. However a four-line system offers a full capability to both change direction of glide, and to initiate and control a spin, and may be used in conjunction with any number of existing methods and apparatus to steer a gliding parachute/kite once gliding in a given direction.

In some implementations, the four-line system involves two x two line pairs controlled together. When two lines can be controlled together, then a common pulley or common lever arm works well. In the illustrated example, shown is a common pulley with a rotary actuator (not shown) that rotates the pulley one way or another. Lines A and B can have multiple wraps around the common pulley (in opposite directions) to enable greater line length differences during actuation. Although only one pair of lines is shown, two of these can be used to have two independently controlled line pairs. The first two line pair is used to deform the parachute to control direction of glide and to stop forward glide. The second two line pair is used to initiate and modulate the spin.

Although the levers shown in FIGS. 15A to 15C and the pulleys shown in FIGS. 16A to 16C have been described to shorten or lengthen a pair of lines in a dependent manner (e.g. line A lengthens when line B shortens by a corresponding amount, and vice-versa), it is noted that other implementations are possible in which each line could be independently controlled by separate pulleys or separate levers. For example, in some implementations, there is provided multiple levers (or pulleys) for shortening or lengthening a first subset of suspension lines independently from shortening or lengthening a second subset of suspension lines, and multiple actuators for the multiple of levers (or pulleys).

This can enable refined control whereby deflection and relaxation of the first and second transverse edges are not necessarily complementary.

Although the illustrated examples provided herein generally focus on control provided by a controller, in alternative implementations a person manually controls the gliding parachute/kite in which case it is possible that there is no controller present. Implementations that support a combination of manual control by a person and control by a controller are also possible and are within the scope of the disclosure.

CLAUSES

Some aspects of the disclosure are described by the following clauses:

Clause 1. A gliding parachute/kite, comprising: a wing comprised of flexible material and having a first transverse edge and a second transverse edge; a set of suspension lines adapted for coupling a load to the wing, such that the coupling is configurable in any one of a plurality of possible states based on relative lengths of the suspension lines; wherein the plurality of possible states comprises: a first state in which the wing is deformed during flight with more deformation towards the first transverse edge compared to the second transverse edge, thereby causing the first transverse edge to be a leading edge and the second transverse edge to be a trailing edge relative to a free stream; and a second state in which the wing is deformed during flight with more deformation towards the second transverse edge compared to the first transverse edge, thereby causing the second transverse edge to be the leading edge and the first transverse edge to be the trailing edge relative to the free stream.

Clause 2. The gliding parachute/kite of Clause 1, wherein the gliding parachute/kite is a gliding parachute configured to transport an object as part of the load.

Clause 3. The gliding parachute/kite of Clause 1, wherein the gliding parachute/kite is a gliding kite configured to be tethered to an object as part of the load.

Clause 4. The gliding parachute/kite of any one of Clauses 1 to 3, wherein during flight the wing comprises a concave shape and the deformation comprises concavity.

Clause 5. The gliding parachute/kite of any one of Clauses 1 to 4, wherein the wing has a thickness corresponding to a thickness of the flexible material.

Clause 6. The gliding parachute/kite of any one of Clauses 1 to 5, wherein the wing is configured such that gliding is possible in either longitudinal direction in substantially a same way.

Clause 7. The gliding parachute/kite of Clause 6, wherein the wing is substantially symmetrical such that a first half of the wing having the first transverse edge substantially mirrors a second half of the wing having the second transverse edge.

Clause 8. The gliding parachute/kite of any one of Clauses 1 to 7, wherein the wing comprises four corners.

Clause 9. The gliding parachute/kite of any one of Clauses 1 to 8, wherein the wing is configured to provide more lift than drag.

Clause 10. The gliding parachute/kite of any one of Clauses 1 to 9, wherein the wing has an aspect ratio of wingspan to mean chord that is greater than one.

Clause 11. The gliding parachute/kite of any one of Clauses 1 to 10, comprising: a controller for controlling the coupling of the load to the wing and for transitioning between the plurality of possible states by manipulating a length of at least some of the suspension lines.

Clause 12. The gliding parachute/kite of Clause 11, wherein: for the first state, the controller (i) shortens a first subset of the suspension lines that is connected to the wing in a vicinity of the first transverse edge and/or (ii) lengthens a second subset of the suspension lines that is connected to the wing in a vicinity of the second transverse edge.

Clause 13. The gliding parachute/kite of Clause 11, wherein: for the second state, the controller (i) shortens a second subset of the suspension lines that is connected to the wing in a vicinity of the second transverse edge and/or (ii) lengthens a first subset of the suspension lines that is connected to the wing in a vicinity of the first transverse edge.

Clause 14. The gliding parachute/kite of Clause 12 or Clause 13, wherein the controller comprises: a lever configured to pivot about a point and having two opposing ends including a first end coupled to the first subset of the suspension lines and a second end coupled to the second subset of the suspension lines; and an actuator configured to move the lever.

Clause 15. The gliding parachute/kite of Clause 12 or Clause 13, wherein the controller comprises: a plurality of levers for shortening or lengthening the first subset of the suspension lines independently from shortening or lengthening the second subset of the suspension lines; and a plurality of actuators for the plurality of levers.

Clause 16. The gliding parachute/kite of Clause 12 or Clause 13, wherein the controller comprises: a pulley having a wheel supporting movement of a drive element having two opposing ends including a first end coupled to the first subset of the suspension lines and a second end coupled to the second subset of the suspension lines; and an actuator configured to rotate the wheel.

Clause 17. The gliding parachute/kite of Clause 12 or Clause 13, wherein the controller comprises: a plurality of pulleys for shortening or lengthening the first subset of the suspension lines independently from shortening or lengthening the second subset of the suspension lines; and a plurality of actuators for the plurality of pulleys.

Clause 18. The gliding parachute/kite of any one of Clauses 14 to 17, wherein the controller further comprises: navigation and control sensors configured to produce sensor readings; and a computing device configured to control each actuator based on the sensor readings.

Clause 19. The gliding parachute/kite of any one of Clauses 11 to 18, wherein the wing comprises four corners including a first pair of diagonally opposing corners and a second pair of diagonally opposing corners, and the plurality of possible states further comprises: a third state in which the wing is deformed during flight with more deformation towards the first pair of diagonally opposing corners of the wing compared to the second pair of diagonally opposing corners of the wing, thereby causing the gliding parachute/kite to spin around an axis that is substantially orthogonal to the wing.

Clause 20. The gliding parachute/kite of Clause 19, wherein: for the third state, the controller (i) shortens a third subset of the suspension lines that is connected to the wing in vicinity of each opposing corner of the first pair of diagonally opposing corners and/or (ii) lengthens a fourth subset of the suspension lines that is connected to the wing in vicinity of each opposing corner of the second pair of diagonally opposing corners.

Clause 21. The gliding parachute/kite of Clause 20, wherein the controller comprises: a lever configured to pivot about a point and having two opposing ends including a first end coupled to the third subset of the suspension lines and a second end coupled to the fourth subset of the suspension lines; and an actuator configured to move the lever.

Clause 22. The gliding parachute/kite of Clause 20, wherein the controller comprises: a plurality of levers for shortening or lengthening the third subset of the suspension lines independently from shortening or lengthening the fourth subset of the suspension lines; and a plurality of actuators for the plurality of levers.

Clause 23. The gliding parachute/kite of Clause 20, wherein the controller comprises: a pulley having a wheel supporting movement of a drive element having two opposing ends including a first end coupled to the third subset of the suspension lines and a second end coupled to the fourth subset of the suspension lines; and an actuator configured to rotate the wheel.

Clause 24. The gliding parachute/kite of Clause 20, wherein the controller comprises: a plurality of pulleys for shortening or lengthening the third subset of the suspension lines independently from shortening or lengthening the fourth subset of the suspension lines; and a plurality of actuators for the plurality of pulleys.

Clause 25. The gliding parachute/kite of any one of Clauses 21 to 24, wherein the controller further comprises: navigation and control sensors configured to produce sensor readings; and a computing device configured to control each actuator based on the sensor readings.

Clause 26. A method of operating a gliding parachute/kite according to any one of Clauses 1 to 25, comprising: gliding in a first direction; and reversing direction thereby gliding in a second direction opposite to the first direction without turning around the gliding parachute/kite.

Clause 27. The method of Clause 26, wherein the gliding parachute/kite is a gliding parachute and the load comprises an object to be delivered to a target area on a landing surface, the method comprising: determining that the gliding parachute will overshoot past the target area on the landing surface if the gliding parachute were to glide in the first direction towards the target area without the reversing of direction step; and executing the reversing of direction step such that the gliding parachute lands in the target area on the landing surface.

Clause 28. The method of Clause 26, wherein the gliding parachute/kite is a gliding parachute and the load comprises an object to be delivered to a target area on a landing surface, the method further comprising: determining that the gliding parachute will overshoot past the target area on the landing surface if the gliding parachute were to glide in the first direction towards the target area without the reversing of direction step; after the reversing of direction step, reversing direction again thereby gliding in the first direction without turning around the gliding parachute/kite; executing both of the reversing of direction steps such that the overshoot past the target area is avoided; and landing on the landing surface in the target area.

Clause 29. The method of any one of Clauses 26 to 28, comprising: executing each reversing of direction step to adjust a rate of descent and/or a touch down time.

Clause 30. The method of any one of Clauses 26 to 29, further comprising: selecting an initial operating state of the plurality of possible states prior to deployment of the gliding parachute/kite.

Numerous modifications and variations of the present disclosure are possible in light of the above teachings. It is therefore to be understood that within the scope of the appended claims, the disclosure may be practised otherwise than as specifically described herein.

We claim:

1. A gliding parachute/kite, comprising:
a wing comprised of flexible material and having four corners including a first pair of diagonally opposing corners and a second pair of diagonally opposing corners;
a set of suspension lines adapted for coupling a load to the wing, such that the coupling is configurable in any one of a plurality of possible states based on relative lengths of the suspension lines;
wherein the plurality of possible states comprises a first state in which the wing is deformed during flight with more deformation towards the first pair of diagonally opposing corners of the wing compared to the second pair of diagonally opposing corners of the wing, thereby causing the gliding parachute/kite to spin around an axis that is substantially orthogonal to the wing and passes through a vicinity of the load.

2. The gliding parachute/kite of claim 1, wherein the gliding parachute/kite is a gliding parachute configured to transport an object as part of the load.

3. The gliding parachute/kite of claim 1, wherein the gliding parachute/kite is a gliding kite configured to be tethered to an object as part of the load.

4. The gliding parachute/kite of claim 1, wherein during flight the wing comprises a concave shape and the deformation comprises concavity.

5. The gliding parachute/kite of claim 1, wherein the wing has a thickness corresponding to a thickness of the flexible material.

6. The gliding parachute/kite of claim 1, wherein the wing comprises two halves configured such that each half of the wing can glide in opposing directions in substantially a same way.

7. The gliding parachute/kite of claim 6, wherein the wing is substantially symmetrical such that the first pair of diagonally opposing corners is substantially equivalent to the second pair of diagonally opposing corners.

8. The gliding parachute/kite of claim 1, wherein the wing is configured to provide more lift than drag.

9. The gliding parachute/kite of claim 1, wherein the wing has an aspect ratio of wingspan to mean chord that is greater than one.

10. The gliding parachute/kite of claim 1, comprising:
a controller for controlling the coupling of the load to the wing and for transitioning between the plurality of possible states by manipulating a length of at least some of the suspension lines.

11. The gliding parachute/kite of claim 10, wherein:
for the first state, the controller (i) shortens a first subset of the suspension lines that is connected to the wing in a vicinity of each opposing corner of the first pair of diagonally opposing corners and/or (ii) lengthens a second subset of the suspension lines that is connected to the wing in a vicinity of each opposing corner of the second pair of diagonally opposing corners.

12. The gliding parachute/kite of claim 11, wherein the controller comprises:
a lever configured to pivot about a point and having two opposing ends including a first end coupled to the first subset of the suspension lines and a second end coupled to the second subset of the suspension lines; and
an actuator configured to move the lever.

13. The gliding parachute/kite of claim 12, wherein the controller further comprises:
navigation and control sensors configured to produce sensor readings; and a computing device configured to control each actuator based on the sensor readings.

14. The gliding parachute/kite of claim 11, wherein the controller comprises:
a plurality of levers for shortening or lengthening the first subset of the suspension lines independently from shortening or lengthening the second subset of the suspension lines; and
a plurality of actuators for the plurality of levers.

15. The gliding parachute/kite of claim 11, wherein the controller comprises:
a pulley having a wheel supporting movement of a drive element having two opposing ends including a first end coupled to the first subset of the suspension lines and a second end coupled to the second subset of the suspension lines; and
an actuator configured to rotate the wheel.

16. The gliding parachute/kite of claim 11, wherein the controller comprises:
a plurality of pulleys for shortening or lengthening the first subset of the suspension lines independently from shortening or lengthening the second subset of the suspension lines; and
a plurality of actuators for the plurality of pulleys.

17. The gliding parachute/kite of claim 10, wherein the plurality of possible states further comprises:
a second state in which the wing has substantially a same deformation towards the first pair of diagonally opposing corners of the wing compared to the second pair of diagonally opposing corners of the wing, thereby avoiding the gliding parachute/kite from spinning.

18. A method of operating a gliding parachute/kite according to claim 1, comprising:
gliding along a trajectory;
spinning around the axis that is substantially orthogonal to the wing and passes through a vicinity of the load thereby stopping the gliding and changing the trajectory.

19. The method of claim 18, wherein the gliding parachute/kite is a gliding parachute and the load comprises an object to be delivered to a target area on a landing surface, the method comprising:
determining that the gliding parachute will overshoot past the target area on the landing surface if the gliding parachute/kite were to glide towards the target area without the spinning;
executing the spinning such that the overshoot past the target area is avoided; and
landing on the landing surface in the target area.

20. The method of claim 18, further comprising:
halting the spinning thereby resuming the gliding.

21. The method of claim 18, wherein the spinning is halted to resume the gliding in a purposefully specific direction.

22. The method of claim 18, comprising:
modulating the spinning thereby controlling a rate of descent.

23. The method of claim 18, comprising:
selecting between spinning in a clockwise direction or a counter-clockwise direction.

24. The method of claim 18, further comprising:
selecting an initial operating state of the plurality of possible states prior to deployment of the gliding parachute/kite.

* * * * *